US012794005B2

(12) United States Patent
Erb et al.

(10) Patent No.: US 12,794,005 B2
(45) Date of Patent: Nov. 10, 2026

(54) BATTERY CONFIGURATIONS HAVING THROUGH-PACK FASTENERS

(71) Applicant: Stacked Energy, Inc., San Jose, CA (US)

(72) Inventors: Dylan Erb, San Jose, CA (US); Abraham B. Caulk, Livermore, CA (US); Ross L. Johnstal, Sunnyvale, CA (US); Paul W. Firehammer, West Olive, MI (US); Edward T. Hillstrom, Vancouver (CA); Zhongying Shi, Sunnyvale, CA (US); Ian E. O'Connor, Campbell, CA (US); Alexander J. Clarabut, Santa Clara, CA (US)

(73) Assignee: Stacked Energy, Inc., San Jose, CA (US)

( * ) Notice: Subject to any disclaimer, the term of this patent is extended or adjusted under 35 U.S.C. 154(b) by 106 days.

(21) Appl. No.: 18/413,998

(22) Filed: Jan. 16, 2024

(65) Prior Publication Data

US 2024/0372130 A1 Nov. 7, 2024

Related U.S. Application Data

(63) Continuation of application No. 17/014,637, filed on Sep. 8, 2020, now Pat. No. 11,923,494.

(51) Int. Cl.
*H01M 10/04* (2006.01)
*H01M 10/42* (2006.01)
(Continued)

(52) U.S. Cl.
CPC ..... *H01M 10/0481* (2013.01); *H01M 10/425* (2013.01); *H01M 10/613* (2015.04);
(Continued)

(58) Field of Classification Search
CPC ........... H01M 10/0481; H01M 10/613; H01M 10/6556; H01M 10/425; H01M 10/0413; H01M 10/0436; H01M 50/20
See application file for complete search history.

(56) References Cited

U.S. PATENT DOCUMENTS 4,317,864 A 3/1982 Strasser
4,374,186 A 2/1983 McCartney et al.
(Continued)

FOREIGN PATENT DOCUMENTS

CN 1439180 A 8/2003
CN 1620735 A 5/2005
(Continued)

OTHER PUBLICATIONS

U.S. Appl. No. 15/742,009 , Non-Final Office Action, Mailed on Nov. 30, 2020, 13 pages.

(Continued)

*Primary Examiner* — Jimmy Vo
(74) *Attorney, Agent, or Firm* — Fenwick & West LLP

(57) ABSTRACT

Energy storage devices, battery cells, and batteries of the present technology may include a base plate. The batteries may include a first circuit board overlying the base plate. The batteries may include a battery stack overlying the first circuit board and electrically coupled with the first circuit board. The battery stack may include a plurality of battery cells. The battery stack may define an aperture through an active region of the battery stack. The batteries may include a second circuit board overlying the battery stack and electrically coupled with the battery stack. The batteries may include a compression plate overlying the second circuit board. The batteries may include a retaining member compressibly coupling the compression plate with the base plate.
(Continued)

The retaining member may extend through the aperture through the active region of the battery stack.

20 Claims, 11 Drawing Sheets

(51) Int. Cl.
*H01M 10/613* (2014.01)
*H01M 10/6556* (2014.01)
*H01M 50/20* (2021.01)

(52) U.S. Cl.
CPC ....... *H01M 10/6556* (2015.04); *H01M 50/20* (2021.01); *H01M 10/0413* (2013.01); *H01M 10/0436* (2013.01)

(56) References Cited

U.S. PATENT DOCUMENTS

| | | | |
|---|---|---|---|
| 4,567,119 | A | 1/1986 | Lim |
| 5,162,169 | A | 11/1992 | Tomantschger et al. |
| 5,162,172 | A | 11/1992 | Kaun |
| 5,254,415 | A | 10/1993 | Williams et al. |
| 5,367,431 | A | 11/1994 | Kunishi et al. |
| 5,837,158 | A | 11/1998 | Shepodd et al. |
| 6,004,698 | A | 12/1999 | Richardson et al. |
| 7,501,208 | B2 | 3/2009 | Feddrix et al. |
| 8,124,266 | B2 | 2/2012 | Yamazaki |
| 8,153,410 | B2 | 4/2012 | Jaffe |
| 8,163,410 | B2 | 4/2012 | Fulop et al. |
| 8,357,469 | B2 | 1/2013 | Shaffer, II et al. |
| 8,663,833 | B2 | 3/2014 | Hosaka et al. |
| 9,142,811 | B2 | 9/2015 | Chami |
| 10,916,741 | B1 | 2/2021 | Dafoe et al. |
| 10,916,796 | B1 | 2/2021 | Zeilinger et al. |
| 10,923,728 | B1 | 2/2021 | Zeng |
| 11,018,343 | B1 | 5/2021 | Dafoe et al. |
| 11,043,703 | B1 | 6/2021 | Zeng et al. |
| 11,189,834 | B1 | 11/2021 | Zeng |
| 11,189,855 | B1 | 11/2021 | O'Neill et al. |
| 11,228,074 | B2 | 1/2022 | Kaye et al. |
| 11,296,351 | B1 | 4/2022 | Gorer et al. |
| 11,296,361 | B2 | 4/2022 | Chu et al. |
| 11,335,977 | B1 | 5/2022 | Zeng et al. |
| 11,349,161 | B2 | 5/2022 | Kaye et al. |
| 11,367,877 | B1 | 6/2022 | Xu et al. |
| 11,532,824 | B2 | 12/2022 | Chu et al. |
| 11,588,155 | B1 | 2/2023 | Erb et al. |
| 11,600,891 | B1 | 3/2023 | Erb et al. |
| 11,652,230 | B1 | 5/2023 | Gorer et al. |
| 11,677,120 | B2 | 6/2023 | Erb et al. |
| 11,699,815 | B1 | 7/2023 | Zeng et al. |
| 11,791,470 | B2 | 10/2023 | Campbell et al. |
| 11,862,801 | B1 | 1/2024 | Zeng |
| 11,888,112 | B2 | 1/2024 | Kaye et al. |
| 11,923,494 | B2 | 3/2024 | Erb et al. |
| 2001/0038939 | A1 | 11/2001 | Bailey |
| 2002/0146620 | A1 | 10/2002 | Connell |
| 2002/0164530 | A1 | 11/2002 | Iwakura et al. |
| 2003/0027051 | A1 | 2/2003 | Kejha et al. |
| 2003/0096170 | A1 | 5/2003 | Fujiwara et al. |
| 2003/0194605 | A1 | 10/2003 | Fauteux et al. |
| 2004/0001302 | A1 | 1/2004 | Sato et al. |
| 2005/0019643 | A1 | 1/2005 | Sugita et al. |
| 2005/0106456 | A1 | 5/2005 | Puester et al. |
| 2005/0186478 | A1 | 8/2005 | Iwakura et al. |
| 2006/0097701 | A1 | 5/2006 | Kodama et al. |
| 2007/0210760 | A1 | 9/2007 | Shimamura et al. |
| 2008/0187824 | A1 | 8/2008 | Tomantschger |
| 2009/0023059 | A1 | 1/2009 | Kinoshita et al. |
| 2009/0068531 | A1 | 3/2009 | Sawa et al. |
| 2009/0087728 | A1 | 4/2009 | Less et al. |
| 2009/0117456 | A1 | 5/2009 | Hosaka et al. |
| 2009/0136832 | A1 | 5/2009 | Mitsuda et al. |
| 2009/0233175 | A1 | 9/2009 | Kelley et al. |
| 2009/0297892 | A1 | 12/2009 | Ijaz et al. |
| 2010/0124693 | A1 | 5/2010 | Kosugi et al. |
| 2010/0134942 | A1 | 6/2010 | Wang et al. |
| 2010/0285355 | A1 | 11/2010 | Kozinsky et al. |
| 2011/0014532 | A1 | 1/2011 | Knuckey et al. |
| 2011/0294007 | A1 | 12/2011 | Hosaka et al. |
| 2012/0148913 | A1 | 6/2012 | Chiba |
| 2012/0156552 | A1 | 6/2012 | Miyazaki et al. |
| 2012/0189896 | A1 | 7/2012 | Zhou et al. |
| 2012/0219835 | A1 | 8/2012 | Kawabe et al. |
| 2012/0263995 | A1 | 10/2012 | Naito et al. |
| 2013/0065106 | A1 | 3/2013 | Faust |
| 2013/0089774 | A1 | 4/2013 | Chami |
| 2013/0242593 | A1 | 9/2013 | LoRocco et al. |
| 2013/0266823 | A1 | 10/2013 | Lee |
| 2014/0127542 | A1 | 5/2014 | Li et al. |
| 2014/0154542 | A1 | 6/2014 | Issaev et al. |
| 2014/0178735 | A1 | 6/2014 | Wang et al. |
| 2014/0178753 | A1 | 6/2014 | Chu et al. |
| 2015/0037616 | A1 | 2/2015 | Wyatt et al. |
| 2015/0155564 | A1 | 6/2015 | Chami et al. |
| 2015/0200393 | A1 | 7/2015 | Li et al. |
| 2015/0228937 | A1 | 8/2015 | Spilker |
| 2015/0236543 | A1 | 8/2015 | Brushett et al. |
| 2015/0280259 | A1 | 10/2015 | Anderson et al. |
| 2015/0311490 | A1 | 10/2015 | Murase et al. |
| 2015/0325894 | A1 | 11/2015 | Merriman et al. |
| 2016/0036030 | A1* | 2/2016 | Frias .................. H01M 50/526 429/121 |
| 2016/0049646 | A1 | 2/2016 | Fujiki et al. |
| 2016/0049679 | A1 | 2/2016 | Stevens et al. |
| 2016/0093845 | A1 | 3/2016 | DeKeuster et al. |
| 2016/0099456 | A1 | 4/2016 | Kwon et al. |
| 2016/0099490 | A1 | 4/2016 | Larsson |
| 2016/0111729 | A1 | 4/2016 | Kim et al. |
| 2016/0197352 | A1 | 7/2016 | Blaser et al. |
| 2016/0248113 | A1 | 8/2016 | He et al. |
| 2016/0329535 | A1 | 11/2016 | Moomaw et al. |
| 2016/0329606 | A1 | 11/2016 | Ro et al. |
| 2017/0012331 | A1 | 1/2017 | Ng et al. |
| 2017/0077545 | A1 | 3/2017 | Shaffer, II et al. |
| 2017/0110765 | A1 | 4/2017 | Yadav et al. |
| 2017/0133689 | A1 | 5/2017 | Moore et al. |
| 2017/0214057 | A1 | 7/2017 | Kotik et al. |
| 2017/0250434 | A1 | 8/2017 | Gennett et al. |
| 2018/0013133 | A1 | 1/2018 | Armacanqui et al. |
| 2018/0013144 | A1 | 1/2018 | Li et al. |
| 2018/0079721 | A1 | 3/2018 | Armand et al. |
| 2018/0097248 | A1 | 4/2018 | Nariyama et al. |
| 2018/0175427 | A1 | 6/2018 | Nariyama |
| 2018/0175470 | A1 | 6/2018 | Bai et al. |
| 2018/0219227 | A1 | 8/2018 | Moomaw et al. |
| 2018/0226654 | A1 | 8/2018 | Ohsawa et al. |
| 2018/0294454 | A1 | 10/2018 | Mackenzie et al. |
| 2018/0316063 | A1 | 11/2018 | Masel et al. |
| 2018/0316064 | A1 | 11/2018 | Wei et al. |
| 2019/0036147 | A1 | 1/2019 | Yuan et al. |
| 2019/0237748 | A1 | 8/2019 | Shin et al. |
| 2020/0028166 | A1 | 1/2020 | Tanaka et al. |
| 2020/0083505 | A1 | 3/2020 | Kaye et al. |
| 2020/0212440 | A1 | 7/2020 | Kolhekar et al. |
| 2020/0395594 | A1 | 12/2020 | Doi et al. |
| 2021/0028457 | A1 | 1/2021 | Newhouse et al. |
| 2022/0111758 | A1 | 4/2022 | Ijaz et al. |
| 2022/0111759 | A1 | 4/2022 | Ijaz |
| 2022/0115897 | A1 | 4/2022 | Ijaz |
| 2023/0026549 | A1 | 1/2023 | Ijaz et al. |

FOREIGN PATENT DOCUMENTS

| | | | |
|---|---|---|---|
| CN | 101202355 | A | 6/2008 |
| CN | 101809801 | A | 8/2010 |
| CN | 101884125 | A | 11/2010 |
| CN | 102005566 | A | 4/2011 |
| CN | 102187504 | A | 9/2011 |
| CN | 102272977 | A | 12/2011 |
| CN | 102341948 | A | 2/2012 |
| CN | 102473984 | A | 5/2012 |
| CN | 102576850 | A | 7/2012 |

(56) References Cited

FOREIGN PATENT DOCUMENTS

| | | | | |
|---|---|---|---|---|
| CN | 103069614 | A | 4/2013 | |
| CN | 103165920 | A | 6/2013 | |
| CN | 103222098 | A | 7/2013 | |
| CN | 103548196 | A | 1/2014 | |
| CN | 103650216 | A | 3/2014 | |
| CN | 103855360 | A | 6/2014 | |
| CN | 103904294 | A | 7/2014 | |
| CN | 104466191 | A | 3/2015 | |
| CN | 104604003 | A | 5/2015 | |
| CN | 104779412 | A | 7/2015 | |
| CN | 107851747 | A | 3/2018 | |
| CN | 111180738 | A | 5/2020 | |
| EP | 0114667 | A2 * | 8/1984 | ............ H01M 50/50 |
| EP | 1125336 | A1 | 8/2001 | |
| EP | 1156547 | A1 | 11/2001 | |
| EP | 2892097 | A1 | 7/2015 | |
| EP | 3196955 | A1 | 7/2017 | |
| EP | 3317907 | A | 5/2018 | |
| EP | 3435473 | A1 | 1/2019 | |
| JP | 6435864 | A | 2/1989 | |
| JP | 0562683 | A | 3/1993 | |
| JP | 06503442 | A | 4/1994 | |
| JP | 07161346 | A | 6/1995 | |
| JP | 2001316104 | A | 11/2001 | |
| JP | 2001357854 | A | 12/2001 | |
| JP | 2002343452 | A | 11/2002 | |
| JP | 2003096219 | A | 4/2003 | |
| JP | 3522303 | B2 | 4/2004 | |
| JP | 2005005163 | A | 1/2005 | |
| JP | 2006012556 | A | 1/2006 | |
| JP | 2007012584 | A | 1/2007 | |
| JP | 2009224097 | A | 10/2009 | |
| JP | 2011009203 | A | 1/2011 | |
| JP | 2011071011 | A | 4/2011 | |
| JP | 4857710 | B2 | 1/2012 | |
| JP | 2012234823 | A | 11/2012 | |
| JP | 2013114746 | A | 6/2013 | |
| JP | 2013187074 | A | 9/2013 | |
| JP | 5410822 | B2 | 2/2014 | |
| JP | 2014029818 | A | 2/2014 | |
| JP | 2018083957 | A | 5/2018 | |
| JP | 2018519646 | A | 7/2018 | |
| JP | 6636607 | | 12/2019 | |
| KR | 20130066795 | A | 6/2013 | |
| WO | 8504287 | A1 | 9/1985 | |
| WO | 9210861 | A1 | 6/1992 | |
| WO | 2010111087 | A1 | 9/2010 | |
| WO | 2016031689 | A1 | 3/2016 | |
| WO | 2017007827 | A1 | 1/2017 | |
| WO | 2018057566 | A1 | 3/2018 | |
| WO | 2018195372 | A1 | 10/2018 | |
| WO | 2018213601 | A2 | 11/2018 | |
| WO | 2019023010 | A1 | 1/2019 | |
| WO | 2019059133 | A1 | 3/2019 | |
| WO | 2019184311 | A1 | 10/2019 | |
| WO | 2019245461 | A1 | 12/2019 | |
| WO | 2021048028 | A1 | 3/2021 | |

OTHER PUBLICATIONS

U.S. Appl. No. 15/742,009 , Non-Final Office Action, Mailed on Nov. 15, 2019, 14 pages.
U.S. Appl. No. 15/742,009 , Non-Final Office Action, Mailed on Aug. 3, 2021, 16 pages.
U.S. Appl. No. 15/742,009 , Notice of Allowance, Mailed on Dec. 24, 2021, 12 pages.
U.S. Appl. No. 15/962,133 , Final Office Action, Mailed on Jul. 7, 2020, 5 pages.
U.S. Appl. No. 15/962,133 , Non-Final Office Action, Mailed on Jan. 21, 2020, 10 pages.
U.S. Appl. No. 16/007,534 , Non-Final Office Action, Mailed on May 5, 2020, 11 pages.
U.S. Appl. No. 16/007,534 , Notice of Allowance, Mailed on Nov. 18, 2020, 8 pages.
U.S. Appl. No. 16/038,865 , Final Office Action, Mailed on Jun. 1, 2021, 7 pages.
U.S. Appl. No. 16/038,865 , Non-Final Office Action, Mailed on Nov. 6, 2020, 13 pages.
U.S. Appl. No. 16/049,250 , Non-Final Office Action, Mailed on Apr. 8, 2020, 8 pages.
U.S. Appl. No. 16/108,498 , Final Office Action, Mailed on Dec. 9, 2020, 25 pages.
U.S. Appl. No. 16/108,498 , Non-Final Office Action, Mailed on May 17, 2021, 21 pages.
U.S. Appl. No. 16/108,503 , Final Office Action, Mailed on Oct. 12, 2022, 8 pages.
U.S. Appl. No. 16/108,503 , Final Office Action, Mailed on May 25, 2021, 9 pages.
U.S. Appl. No. 16/108,503 , Non-Final Office Action, Mailed on Oct. 2, 2020, 11 pages.
U.S. Appl. No. 16/108,503 , Non-Final Office Action, Mailed on Feb. 2, 2022, 9 pages.
U.S. Appl. No. 16/108,522 , Non-Final Office Action, Mailed on Sep. 9, 2020, 10 pages.
U.S. Appl. No. 16/245,542 , Non-Final Office Action, Mailed on May 11, 2021, 14 pages.
U.S. Appl. No. 16/263,890 , Non-Final Office Action, Mailed on Jun. 16, 2020, 9 pages.
U.S. Appl. No. 16/273,625 , Final Office Action, Mailed on Feb. 16, 2021, 14 pages.
U.S. Appl. No. 16/273,625 , Non-Final Office Action, Mailed on May 4, 2020, 14 pages.
U.S. Appl. No. 16/273,625 , Non-Final Office Action, Mailed on Dec. 24, 2021, 16 pages.
U.S. Appl. No. 16/522,475 , Non-Final Office Action, Mailed on May 17, 2021, 17 pages.
U.S. Appl. No. 16/538,660 , Non-Final Office Action, Mailed on Feb. 16, 2021, 12 pages.
U.S. Appl. No. 16/658,442 , Final Office Action, Mailed on Aug. 16, 2022, 15 pages.
U.S. Appl. No. 16/658,442 , Non-Final Office Action, Mailed on Feb. 22, 2022, 16 pages.
U.S. Appl. No. 16/683,091 , Non-Final Office Action, Mailed on Aug. 18, 2021, 22 pages.
U.S. Appl. No. 16/748,586 , Non-Final Office Action, Mailed on May 14, 2021, 12 pages.
U.S. Appl. No. 16/796,299 , Final Office Action, Mailed on Jul. 28, 2022, 14 pages.
U.S. Appl. No. 16/796,299 , Non-Final Office Action, Mailed on Apr. 1, 2022, 15 pages.
U.S. Appl. No. 16/796,430 , Non-Final Office Action, Mailed on Feb. 11, 2022, 23 pages.
U.S. Appl. No. 16/855,170 , Non-Final Office Action, Mailed on Jul. 27, 2021, 13 pages.
U.S. Appl. No. 16/855,170 , Notice of Allowance, Mailed on Sep. 24, 2021, 9 pages.
U.S. Appl. No. 17/014,550 , Notice of Allowance, Mailed on Oct. 18, 2022, 10 pages.
U.S. Appl. No. 17/014,637 , Non-Final Office Action, Mailed on Feb. 24, 2022, 20 pages.
U.S. Appl. No. 17/014,637 , Non-Final Office Action, Mailed on Jul. 25, 2022, 20 pages.
U.S. Appl. No. 17/014,717 , Non-Final Office Action, Mailed on Oct. 13, 2022, 14 pages.
U.S. Appl. No. 17/014,768 , Non-Final Office Action, Mailed on Jun. 30, 2022, 10 pages.
U.S. Appl. No. 17/353,059 , Non-Final Office Action, Mailed on Nov. 1, 2022, 8 pages.
Boeva et al., “Soluble and Highly Ionically Conducting Interpolyelectrolyte Complexes Prepared via Chemical Template Polymerization of Aniline in the Presence of Perfluorinated Polysulfonic Acid”, The Royal Society of Chemistry, vol. 4, No. 100, Oct. 31, 2014, pp. 56677-56681.
China Patent Application No. 201680039891.9 , Notice of Decision to Grant, Mailed on Mar. 22, 2021, 2 pages.
China Patent Application No. 201680039891.9 , Office Action, Mailed on Jun. 10, 2020, 18 pages.

(56) References Cited

OTHER PUBLICATIONS

China Patent Application No. 201680039891.9 , Office Action, Mailed on Jan. 6, 2020, 23 pages.
China Patent Application No. 201680039891.9 , Office Action, Mailed on Oct. 27, 2020, 8 pages.
China Patent Application No. 201780053071.X , Office Action, Mailed on Mar. 18, 2022, 15 pages.
China Patent Application No. 201780053071.X , Office Action, Mailed on Apr. 27, 2023, 16 pages.
China Patent Application No. 201780053071.X , Office Action, Mailed on Nov. 2, 2021, 20 pages.
China Patent Application No. 201780053071.X , Office Action, Mailed on Apr. 16, 2021, 21 pages.
China Patent Application No. 201780053071.X , Office Action, Mailed on Aug. 30, 2022, 29 pages.
China Patent Application No. 201880026199.1 , Office Action, Mailed on Dec. 15, 2022, 13 pages.
China Patent Application No. 201880026199.1 , Office Action, Mailed on May 10, 2023, 20 pages.
China Patent Application No. 201880026199.1 , Office Action, Mailed on Mar. 3, 2022, 8 pages.
China Patent Application No. 201880047002.2 , Office Action, Mailed on Feb. 27, 2023, 11 pages.
China Patent Application No. 201880047002.2 , Office Action, Mailed on Oct. 24, 2022, 11 pages.
China Patent Application No. 201880047002.2 , Office Action, Mailed on Nov. 24, 2021, 16 pages.
China Patent Application No. 201880047002.2 , Office Action, Mailed on May 4, 2023, 6 pages.
China Patent Application No. 201880047002.2 , Office Action, Mailed on Jun. 10, 2022, 9 pages.
China Patent Application No. 202011204662.2 , Office Action, Mailed on Aug. 26, 2022, 14 pages.
China Patent Application No. 202011211648.5 , Notice of Decision to Grant, Mailed on Mar. 6, 2023, 2 pages.
China Patent Application No. 202011211648.5 , Office Action, Mailed on Aug. 19, 2022, 12 pages.
European Patent Application No. 16738994.9 , Notice of Decision to Grant, Mailed on Sep. 24, 2020, 2 pages.
European Patent Application No. 16738994.9 , Office Action, Mailed on Mar. 23, 2018, 3 pages.
Huang et al., "Understanding the Second Electron Reaction Mechanism of γ-MnO2 and the Rechargeability of Spinel Phases in Alkaline Zn|MnO2 Batteries", ECS Meeting Abstracts, vol. MA2018-02, 2018, 4 pages.
Japan Patent Application No. 2018-500449 , Notice of Decision to Grant, Mailed on Nov. 18, 2019, 2 pages.
Japan Patent Application No. 2018-500449 , Office Action, Mailed on Jan. 21, 2019, 11 pages.
Korea Patent Application No. 10-2018-7000263 , Notice of Decision to Grant, Mailed on Apr. 8, 2020, 2 pages.
Korea Patent Application No. 10-2018-7000263 , Office Action, Mailed on Sep. 27, 2019, 16 pages.
Korea Patent Application No. 10-2018-7000263 , Office Action, Mailed on Feb. 28, 2019, 5 pages.
International Patent Application No. PCT/US2016/041151 , International Preliminary Report on Patentability, Mailed on Jan. 18, 2018, 8 pages.
International Patent Application No. PCT/US2016/041151 , International Search Report and Written Opinion, Mailed on Aug. 25, 2016, 10 pages.
International Patent Application No. PCT/US2017/052413 , International Preliminary Report on Patentability, Mailed on Apr. 4, 2019, 12 pages.
International Patent Application No. PCT/US2017/052413 , International Search Report and Written Opinion, Mailed on Feb. 1, 2018, 19 pages.
International Patent Application No. PCT/US2017/052413 , "Invitation to Pay Additional Fees and, Where Applicable, Protest Fee", Dec. 8, 2017, 11 pages.
International Patent Application No. PCT/US2018/028472 , International Preliminary Report on Patentability, Mailed on Oct. 31, 2019, 10 pages.
International Patent Application No. PCT/US2018/028472 , International Search Report and Written Opinion, Mailed on Jul. 27, 2018, 13 pages.
International Patent Application No. PCT/US2018/033218 , International Preliminary Report on Patentability, Mailed on Nov. 28, 2019, 9 pages.
International Patent Application No. PCT/US2018/033218 , International Search Report and Written Opinion, Mailed on Nov. 16, 2018, 13 pages.
International Patent Application No. PCT/US2018/042598 , International Preliminary Report on Patentability, Mailed on Feb. 6, 2020, 10 pages.
International Patent Application No. PCT/US2018/042598 , International Search Report and Written Opinion, Mailed on Oct. 2, 2018, 14 pages.
International Patent Application No. PCT/US2020/060348 , International Preliminary Report on Patentability, Mailed on May 27, 2022, 8 pages.
International Patent Application No. PCT/US2020/060348 , International Search Report and Written Opinion, Mailed on Mar. 12, 2021, 9 pages.
International Patent Application No. PCT/US2020/060350 , International Preliminary Report on Patentability, Mailed on May 27, 2022, 8 pages.
International Patent Application No. PCT/US2020/060350 , International Search Report and Written Opinion, Mailed on Mar. 12, 2021, 12 pages.
International Patent Application No. PCT/US2021/049023 , International Preliminary Report on Patentability, Mailed on Mar. 23, 2023, 8 pages.
International Patent Application No. PCT/US2021/049023 , International Search Report and Written Opinion, Mailed on Dec. 22, 2021, 11 pages.
Sun et al., "Electrochemical Characterization of Nano V, Ti Doped Mn02 in Primary Lithium Manganese Dioxide Batteries with High Rate", Functional Materials Letters, vol. 9, Issue 1, 2016, pp. 1-13.
Thaler et al., "Automotive Battery Technology", Beijing Institute of Technology Press, Feb. 28, 2017, 5 pages.
Thuc et al., "Study on Synthesis and Characterization of Anion Exchange Membrane Based on Poly (Vinyl Alcohol) Modified by Free-Radical Polymerization", International Journal of Electrochemical Science, vol. 15, Jul. 10, 2020, pp. 8190-8199.
Weng et al., "Three-Electrolyte Electrochemical Energy Storage Systems Using Both Anion- and Cation-Exchange Membranes as Separators", Energy, vol. 167, Jan. 15, 2019, pp. 1-32.
Ye et al., "Metal-Ion (Fe, V, Co, and Ni)-Doped Mn02 Ultrathin Nanosheets Supported on Carbon Fiber Paper for the Oxygen Evolution Reaction", Advanced Functional Materials, vol. 27, No. 44, Oct. 2017, 8 pages.
Yoo et al., "Effects of Vanadium- and Iron-Doping on Crystal Morphology and Electrochemical Properties of 1D Nanostructured Manganese Oxides", Journal of Power Sources, vol. 185, Issue 2, Dec. 2008, pp. 1374-1379.
Yu et al., "Enhancing the Supercapacitor Performance of Graphene/MnO2 Nanostructured Electrodes by Conductive Wrapping", Nano Letters, vol. 11, No. 10, Oct. 12, 2011, pp. 4438-4442.
German Patent and Trademark Office, Office Action, DE Patent Application No. 11 2021 004 787.6, Jul. 3, 2025, 66 pages.

* cited by examiner

BATTERY CONFIGURATIONS HAVING THROUGH-PACK FASTENERS

CROSS-REFERENCES TO RELATED APPLICATIONS

This application is a continuation of and claims priority to U.S. patent application Ser. No. 17/014,637, filed Sep. 8, 2020, entitled "Battery Configurations Having Through-Pack Fasteners," the disclosure of which is hereby incorporated by reference in its entirety for all purposes.

The present technology is related to U.S. Non-Provisional patent application Ser. No. 17/014,717, filed Sep. 8, 2020, entitled: "Battery Configurations Having Through-Pack Fasteners," the disclosure of which is hereby incorporated by reference in its entirety for all purposes.

TECHNICAL FIELD

The present technology relates to batteries and battery components. More specifically, the present technology relates to battery configurations utilizing fasteners extending through active regions of the batteries.

BACKGROUND

In batteries and battery cells, configurations are often limited by the shape of the cell itself. This may impact packaging, monitoring, and a host of other related aspects. Improved designs and processes are needed.

SUMMARY

The present technology relates to energy storage devices, including battery cells and batteries, which may include lithium-ion batteries having a variety of shapes including stacked cells, and which may be or include bipolar batteries as well as batteries stacked in any orientation including vertical and horizontal, for example. These devices may include current collectors configured based on a z-direction transmission of current through the collectors and cell components, although current collectors configured based on an xy-directional transmission of current may also benefit from the present designs. The batteries and cells may include a host of features and material configurations as will be described throughout the present disclosure.

Energy storage devices, battery cells, and batteries of the present technology may include a base plate. The batteries may include a first circuit board overlying the base plate. The batteries may include a battery stack overlying the first circuit board and electrically coupled with the first circuit board. The battery stack may include a plurality of battery cells. The battery stack may define an aperture through an active region of the battery stack. The batteries may include a second circuit board overlying the battery stack and electrically coupled with the battery stack. The batteries may include a compression plate overlying the second circuit board. The batteries may include a retaining member compressibly coupling the compression plate with the base plate. The retaining member may extend through the aperture through the active region of the battery stack.

In some embodiments, each battery cell of the battery stack may include an anode current collector comprising a polymeric material. The battery cells may include an anode active material disposed on the anode current collector. The battery cells may include a cathode current collector comprising a polymeric material. The battery cells may include a cathode active material disposed on the cathode current collector. The battery cells may include a separator disposed between the anode active material and the cathode active material. A seal may be formed in an active region of each battery cell of the battery stack about the aperture defined through the active region of the battery stack. The batteries may include a first compliant pad positioned between the base plate and the first circuit board. The batteries may include a second compliant pad positioned between the second circuit board and the compression plate. The compression plate may be characterized by a profile in an uncompressed state to provide substantially equal pressure on the second circuit board when compressed by the retaining member.

The base plate may be characterized by a profile in an uncompressed state to provide substantially equal pressure on the first circuit board when compressed by the retaining member. The base plate may define a plurality of channels configured to receive a heat exchange fluid. The battery stack may define a plurality of apertures through the active region of the battery stack. The battery may include a plurality of retaining members compressibly coupling the compression plate with the base plate. The compression plate may be characterized by a thickness of less than or about 5 mm. The compression plate with the plurality of retaining members may be configured to substantially maintain planarity of the compression plate under an opposing force of greater than or about 5 psi.

Some embodiments of the present technology may encompass batteries. The batteries may include a base plate. The batteries may include a first circuit board overlying the base plate. The batteries may include a battery stack overlying the first circuit board and electrically coupled with the first circuit board. The battery stack may include a plurality of battery cells. The battery stack may define a plurality of apertures through an active region of the battery stack. The batteries may include a second circuit board overlying the battery stack and electrically coupled with the battery stack. The batteries may include a plurality of retaining members coupling the second circuit board with the base plate. Each retaining member of the plurality of retaining members may extend through a separate aperture of the plurality of apertures through the active region of the battery stack.

In some embodiments, each battery cell of the battery stack may include an anode current collector including a polymeric material. The battery cells may include an anode active material disposed on the anode current collector. The battery cells may include a cathode current collector comprising a polymeric material. The battery cells may include a cathode active material disposed on the cathode current collector. The battery cells may include a separator disposed between the anode active material and the cathode active material. A seal may be formed in an active region of each battery cell of the battery stack about each aperture of the plurality of apertures defined through the active region of the battery stack. The second circuit board may be characterized by a profile in an uncompressed state to provide substantially equal pressure on the battery stack when compressed by the plurality of retaining members. The base plate may define a plurality of channels configured to receive a heat exchange fluid. The batteries may include an enclosure housing the battery stack. The batteries may include a lid coupled with the enclosure housing. Each retaining member of the plurality of retaining members may extend through the lid.

Some embodiments of the present technology may encompass batteries. The batteries may include a base plate.

The base plate may define a plurality of channels configured to receive a heat exchange fluid. The batteries may include a first circuit board overlying the base plate. The batteries may include a battery stack overlying the first circuit board and electrically coupled with the first circuit board. The battery stack may include a plurality of battery cells. The battery stack may define an aperture through an active region of the battery stack. The batteries may include a second circuit board overlying the battery stack and electrically coupled with the battery stack. The batteries may include a retaining member coupling the second circuit board with the base plate. The retaining member may extend through the aperture through the active region of the battery stack.

In some embodiments, each battery cell of the battery stack may include an anode current collector comprising a polymeric material. The battery cells may include an anode active material disposed on the anode current collector. The battery cells may include a cathode current collector comprising a polymeric material. The battery cells may include a cathode active material disposed on the cathode current collector. The battery cells may include a separator disposed between the anode active material and the cathode active material. The base plate may be characterized by a first surface facing the first circuit board. The base plate may be characterized by a second surface opposite the first surface. The plurality of channels may be defined between the first surface of the base plate and the second surface of the base plate. The base plate may define an aperture configured to receive the retaining member. The aperture defined by the base plate may extend through the first surface of the base plate. A channel of the plurality of channels may extend between the retaining member and the second surface. The batteries may include a compression sleeve extending about the retaining member. A thermally conductive potting may couple the compression sleeve with each battery cell of the battery stack.

Such technology may provide numerous benefits over conventional technology. For example, the present devices may provide improved control over cell swelling. Additionally, batteries according to some embodiments of the present technology may facilitate improved heat transfer and cell monitoring utilizing fasteners according to some embodiments of the present technology. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Figure 1:
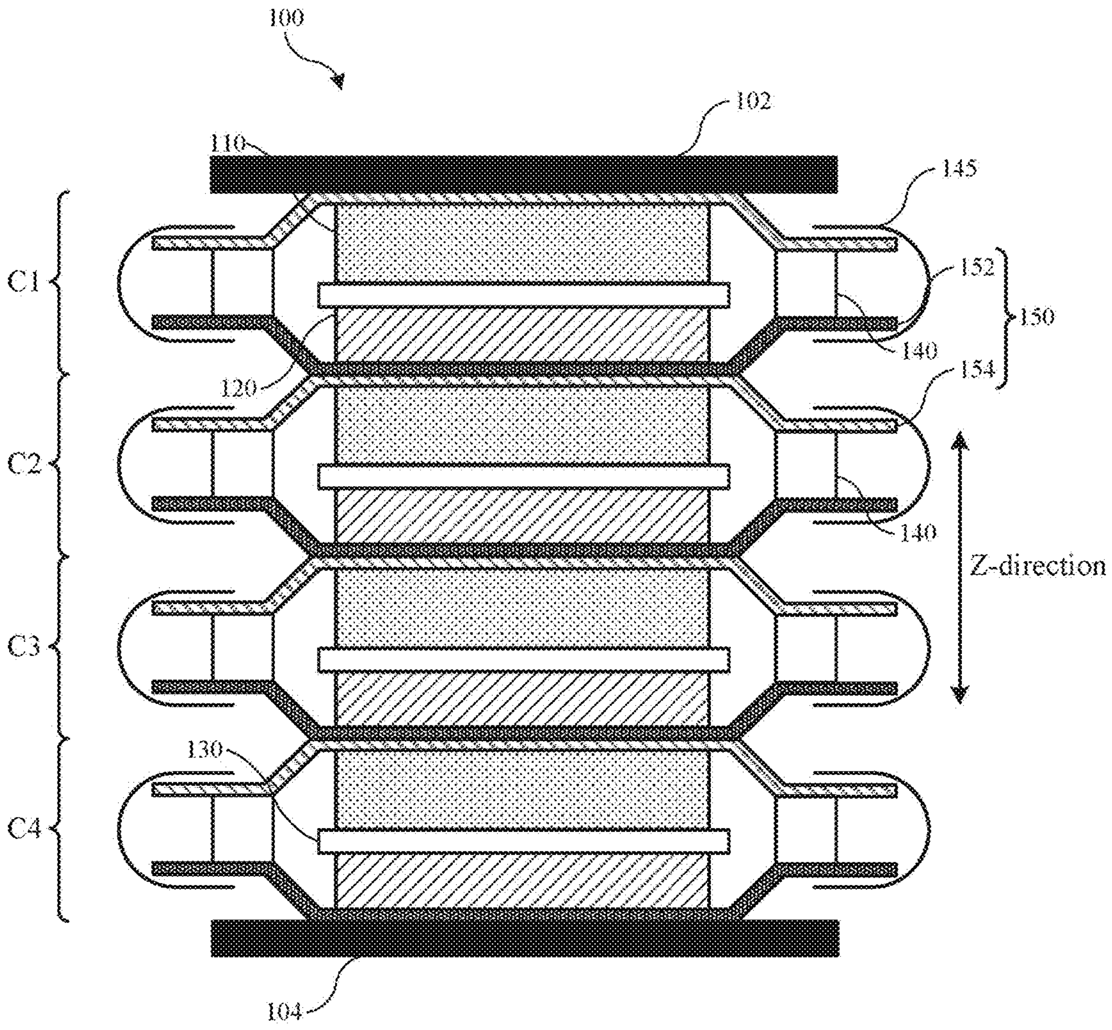
FIG. 1 shows a schematic cross-sectional view of an energy storage device according to some embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, may be grouped in packs, where a battery may include multiple battery cells coupled together to provide a desired voltage or capacity. When batteries are connected in this way, they are often charged and discharged together. When battery cells are characterized by extended dimensions, monitoring voltage, temperature, and other cell characteristics in locations around the cell can be challenged. For example, overall footprint of the battery may suffer due to the incorporation of sensors or probes extending into different regions of the cells, which may be incorporated about the exterior of the cells. This may lower both the volumetric and the gravimetric energy density of the battery formed.

Additionally, battery cells may swell during operation due to normal conditions of the cell. When battery stacks include tens or hundreds of battery cells, this swell may affect a number of different conditions and characteristics of the battery, and may affect packaging. To compensate for the internal swell of the battery cells, packaging or enclosures may be reinforced in any number of ways. However, when battery cells are characterized by extended lateral dimensions, compensating for swell forces at locations further from enclosure couplings may be challenged. For example, although a lid and housing may be secured adequately about the perimeter, in a central region the compensation may be limited to the structural characteristics of the lid. Accordingly, as swell forces may increase with increased numbers of battery cells, compensating for this force may require increased thickness of the lid to limit deformation in regions further from coupling locations. This compensation again may reduce volumetric and gravimetric energy density of the battery based on thicker components.

The present technology overcomes these issues by incorporating fasteners that extend through the active region of the battery cells. The fasteners may facilitate reductions in external structural component thickness, while having a limited reduction on active material incorporation in the battery cells. This may increase battery energy density, while improving pack footprint. Additionally, the fasteners may provide access throughout the battery to access any cell within the stack. This may facilitate monitoring of cell activity, and may facilitate thermal management and other operational aspects as will be described below.

Although the remaining portions of the description will routinely reference lithium-ion batteries, it will be readily understood by the skilled artisan that the technology is not so limited. The present designs may be employed with any number of battery or energy storage devices, including other rechargeable and primary, or non-rechargeable, battery types, as well as electrochemical capacitors also known as supercapacitors or ultracapacitors. Moreover, the present technology may be applicable to batteries and energy storage devices used in any number of technologies that may include, without limitation, phones and mobile devices, handheld electronic devices, laptops and other computers, appliances, heavy machinery, transportation equipment including automobiles, water-faring vessels, air travel equipment, and space travel equipment, as well as any other device that may use batteries or benefit from the discussed designs. Accordingly, the disclosure and claims are not to be considered limited to any particular example discussed, but can be utilized broadly with any number of devices that may exhibit some or all of the electrical or chemical characteristics of the discussed examples.

FIG. 1 depicts a schematic cross-sectional view of an energy storage device according to embodiments of the present technology. The energy storage devices may include a single current collector or coupled current collectors. The energy storage devices may operate in a conventional manner with regard to electronic flow across or through material layers, such as providing electronic mobility across an xy-plane of the current collectors. Additionally, the described devices may operate by electronic flow through the structure in a z-direction through individual cells as opposed to via tabbed current collectors as described above for conventional batteries, where current is delivered laterally across a current collector to a tab, which may be accessed to deliver current from the cell.

As illustrated, the stacked battery 100 may include a stack of electrochemical cells C1, C2, C3, and C4 between end plates 102 and 104. End plates 102 and 104 may be metal current collector plates, which can serve both electrical and mechanical functions. In some embodiments, end plates 102 and 104 can be support plates that form part of an external housing of the stacked battery. End plates 102 and 104 may also provide mechanical support within a housing of the stacked battery. Some or all of the support plates may be electrically conductive, and there may be a terminal within the support plate that is electrically connected to the end plate. In embodiments an additional plate similar to end plates 102 and 104 may be disposed within the stack of cells, such as between two cells. This configuration including an additional plate may provide structural rigidity, and the additional plate may also preform electronic functions similar to end plates 102, 104. End plates 102 and 104 may act as positive and negative terminals of the battery. The cells may pass current in the z-direction through individual cells to the end plates, which may transfer current in any direction across the plate and from the battery.

The stack of electrochemical or battery cells may include any number of electrochemical cells depending on the selected voltage for the stacked battery 100, along with the individual voltage of each individual electrochemical cell. The cell stack may be arranged with as many or as few electrochemical cells in series as desired, as well as with intervening plates for support and current transfer. For example, batteries according to some embodiments of the present technology may include greater than or about 5 battery cells, and may include greater than or about 10, greater than or about 20, greater than or about 50, greater than or about 100, greater than or about 200, greater than or about 500, or more individual cells in a battery. The cells C may be positioned adjacent, e.g. abutting, one another in some configurations. Each electrochemical cell C may include a cathode 110 and an anode 120, where the cathode 110 and anode 120 may be separated by separator 130 between the cathode and anode. Between the anode 120 of cell C1 and the cathode of adjacent cell C2 may be a stacked current collector 150. The stacked current collector 150 may form part of C1 and C2. On one side, stacked current collector 150 may be connected to the seal 140 of C1 and connected on an opposing side to the seal 140 of C2.

In some embodiments, as shown in FIG. 1, stacked current collector 150 may include a first current collector 152 and a second current collector 154. In embodiments one or both of the current collectors may include a metal or a non-metal material, such as a polymer or composite. As shown in the figure, in some embodiments the first current collector 152 and second current collector 154 can be different materials. In some embodiments, the first current collector 152 may be a material selected based on the potential of the anode 120, such as copper or any other suitable metal, as well as a non-metal material including a polymer. The second current collector may be a material selected based on the potential of the cathode 110, such as aluminum or other suitable metals, as well as a non-metal material including a polymer. In other words, the materials for the first and second current collectors can be selected based on electrochemical compatibility with the anode and cathode active materials used.

The first and second current collectors can be made of any material known in the art. For example, copper, aluminum, or stainless steel may be used, as well as composite materials having metallic aspects, and non-metallic materials including polymers. In some instances the metals or non-metals used in the first and second current collector can be the same or different. The materials selected for the anode and cathode active materials can be any suitable battery materials. For example, the anode material can be silicon, graphite, carbon, a tin alloy, lithium metal, a lithium containing material, such as lithium titanium oxide (LTO), or other suitable materials that can form an anode in a battery cell. Additionally, for example, the cathode material can be a lithium-containing material. In some embodiments, the lithium-containing material can be a lithium metal oxide, such as lithium cobalt oxide, lithium manganese oxide, lithium nickel manganese cobalt oxide, lithium nickel cobalt aluminum oxide, or lithium titanate, while in other embodiments, the lithium-containing material can be a lithium iron phosphate, or other suitable materials that can form a cathode in a battery cell.

The first and second current collectors may have any suitable thickness, and may have a thickness that allows for a seal to be formed and provides suitable mechanical stability to prevent failure, such as breakage of the layers, during anticipated usage of the stacked battery. Additionally, the thickness of the current collectors can be sufficiently thin to allow for bending and flexing in the separation region to accommodate expansion anticipated during cycling of the stacked battery, including, for example, up to 10% expansion in the z-direction.

Figure 2:
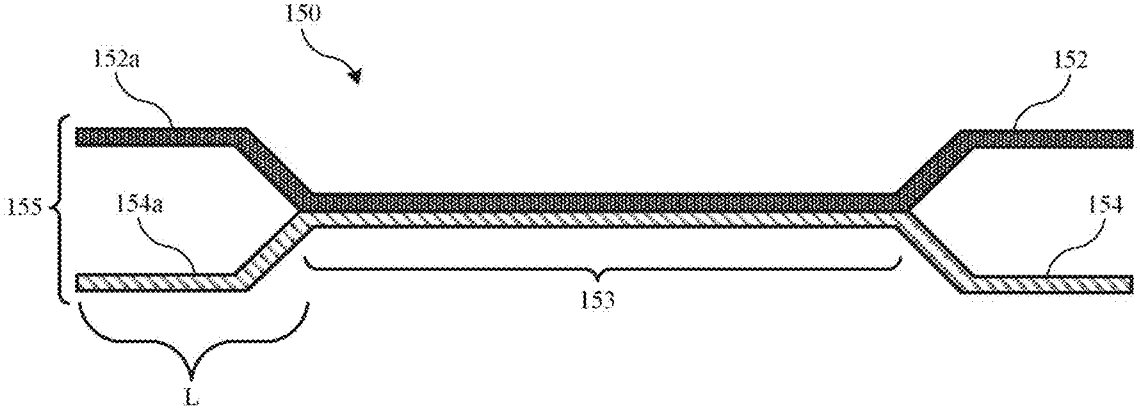
FIG. 2 shows a schematic cross-sectional view of a current collector according to some embodiments of the present technology.

Turning to FIG. 2, the stacked current collector 150 may have a connection region 153 where the first current collector 152 and second current collector 154 may be connected, and a gap region 155 at the peripheral ends of the collector 150. In the connection region 153, the first current collector and second current collector may be in direct contact or otherwise joined to be electrically-conductive. In some embodiments, the first current collector and second current collector may be directly connected, while in other embodiments the first current collector and second current collector may be indirectly connected via a conductive material. To form the connection region 153, the first current collector 152 and the second current collector 154 may be laminated together. Additionally, the connection region 153 may be created by welding the first current collector 152 and the second current collector 154 together. The connection region 153 may also be created by using an adhesive, which may be electrically conductive, between the first current collector 152 and the second current collector 154. In other embodiments, the connection region 153 may be created by the wetting that can occur between the materials of the first current collector 152 and the second current collector 154.

In the gap region 155, the peripheral ends of the first current collector 152 and the second current collector 154 may be spaced apart and moveable relative to each other. As such, there may be a separation distance between the first and second current collectors, which may increase as the electrochemical cell swells. In some embodiments, the spaced apart peripheral ends of the first current collector 152 and the second current collector 154 may be of a length that is sufficient to accommodate an anticipated expansion of the individual electrochemical cells of the stacked battery during cycling of the battery. The peripheral ends of the current collectors 152*a* and 154*a* may have a length L, as shown in FIG. 2, which may be long enough that up to or at least about 10% expansion in the z-direction can be accommodated.

As shown in FIG. 1, each cell C1, C2, C3, and C4, also includes a seal 140, which, with the current collector layers, may electrochemically isolate the electrochemical cells from each other. Thus, each cathode-anode pair may be electrochemically sealed and isolated from neighboring electrochemical cells. Because the current collectors 152 and 154 may be separated at the peripheral ends, separate seals 140 can be formed on opposing sides, such as a top and bottom, of the stacked current collector 150. The seals 140 may be the same or different materials, and each seal 140 may also be a laminate, composite, or coupling of two or more materials in embodiments.

The seal material may be able to bond with the first and second layers of the stacked current collector to prevent electrolyte leakage. The seal material may be a polymer, an epoxy, or other suitable electrically-insulating material that can bond with first and second current collectors to create a seal, which may be a hermetic seal. In some embodiments, the polymer may be polypropylene, polyethylene, polyethylene terephthalate, polytrimethylene terephthalate, polyimide, or any other suitable polymer that may bond with the first and second current collectors of the stacked current collector to form a hermetic seal and may also provide resistance to moisture ingress. The electrolyte may be a solid, a gel, or a liquid in embodiments. The seal may electrochemically isolate each electrochemical cell by hermetically sealing the cell, thereby preventing ions in the electrolyte from escaping to a neighboring electrochemical cell. The seal material may be any material providing adequate bonding with the metal layers such that the seal may be maintained through a predetermined period of time or battery usage.

The separator may be wetted with the electrolyte, such as a fluid electrolyte or gel electrolyte, to incorporate the electrolyte into the stacked battery. Alternatively, a gel electrolyte may coat the separator. In still further alternatives, a gel electrolyte may coat the first metal layer and/or second metal layer before combination. Additionally, the electrolyte may be blended with particles of electrode active material. In various embodiments, incorporating the electrolyte into the components of the stacked battery may reduce gassing in the stacked battery. In variations that include a flexible seal, the stacked battery may accommodate gas resulting from degassing.

The individual electrochemical cells may be formed in any suitable manner. In some embodiments, the cathode 110, the anode 120, and the separator 130 may be preassembled. A first current collector 152 may then be connected to the anode while a second current collector 154 may be connected to the cathode to create a cell. The seal material may be disposed between the first current collector 152 and the second current collector 154 to form seals 140. Finally, the peripheral ends of the sealed electrochemical cell may be further taped to frame the cell. Tapes 145, as well as other coatings, sealing, or material layers, may be disposed around the outer perimeter of the metal layers and seals. The tape 145 may be substituted with ceramic or polymeric materials. Tape 145 may be included for various reasons including to prevent shorting to adjacent layers or to surrounding conductive surfaces within the device, to provide improved electrochemical or chemical stability, and to provide mechanical strength.

FIGS. 1 and 2 illustrate an exemplary stacked battery design according to the present technology. Additional configurations other than illustrated, or as variations on the designs, are also encompassed by the present technology. For example, certain embodiments may not include an additional seal material, and first current collector 152 and second current collector 154 may be directly coupled or bonded together. Additionally, the current collectors may include designs including combinations of polymer material and conductive materials, such as within a matrix.

An exemplary matrix for a current collector may include a polymer disposed as the matrix material or as part of the matrix material. The matrix may provide an insulative design that limits or reduces xy-directional conductivity. The polymer matrix may be developed with a conductive material to produce a current collector having particular electrochemical or composite properties, such as electrical conductivity in the z-direction or through the cell. For example, conductive particulate material may be incorporated within the matrix. The conductive material may include any of the conductive materials previously identified. In embodiments, the conductive material may include one or more of silver, aluminum, copper, stainless steel, and a carbon-containing material. In this way, the current collector may have a tuned resistivity to provide directional control for electrical conductivity. For example, the produced current collector may be configured to provide an in-plane resistivity across a length in the xy-plane, as well as a through-plane resistivity in the z-direction, which is greater than or about $1\times10^{-4}$ ohm-m in embodiments. Additionally, exemplary current collectors may have an in-plane and through-plane resistivity of between about $1\times10^{-3}$ ohm-m and about 1,000 ohm-m. In other embodiments, more conventional electrical distribution may be employed, where current is transferred along conductive current collectors into and out of the cell.

Figure 3:
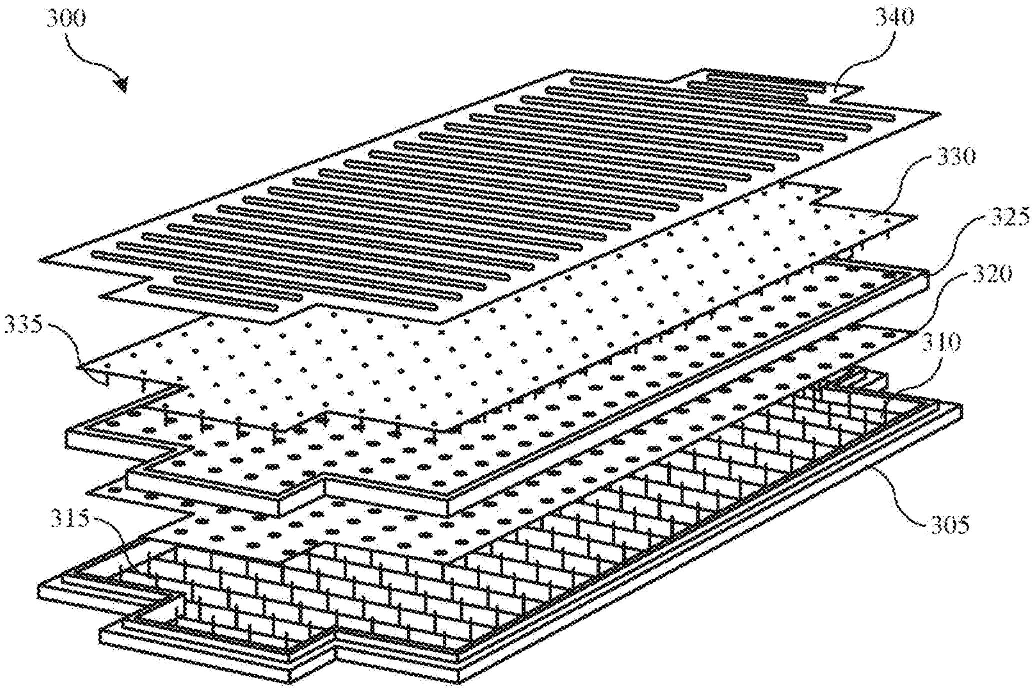
FIG. 3 shows a schematic exploded view of a battery according to some embodiments of the present technology.

Turning to FIG. 3 is shown a schematic exploded view of a battery 300 according to some embodiments of the present technology. Battery 300 may be or include any of the components, features, or characteristics of any of the battery cells previously described, and may illustrate additional details of the components described above, as may be incorporated within a battery. The view illustrated may show one possible formation of a battery pack encompassed by the present technology, although any other geometry may also be produced. Although battery cells may be characterized by any dimensions according to embodiments of the present technology, in some embodiments the battery cells may be characterized by greater length and width dimensions relative to a thickness of the battery cell. For example, in some embodiments, battery cells may be characterized by a length and/or width of greater than or about 100 mm, and may be characterized by a length and/or width of greater than or about 200 mm, greater than or about 500 mm, greater than or about 1.0 m, greater than or about 1.5 m, greater than or about 2.0 m, greater than or about 3.0 m, or more. Additionally, in some embodiments, battery cells may be characterized by a thickness of less than or about 10 mm, and may be characterized by a thickness of less than or about 5 mm, less than or about 3 mm, less than or about 2 mm, less than or about 1 mm, less than or about 0.5 mm, less than or about 0.25 mm, less than or about 0.1 mm, or less. Accordingly, in some embodiments the length and/or width dimension may be several orders of magnitude greater than the battery cell thickness.

Additionally, current collectors may be or include materials characterized by higher resistivity, which may provide an in-plane resistivity that is many orders of magnitude higher than the through-cell resistivity, and which may be many orders of magnitude higher than conventional current collector materials, such as metals. As explained above, this may allow a z-directional transmission of current through the constituent battery cells, while limiting or controlling the lateral transmission of current. However, as discussed previously, this may cause challenges for cell monitoring and cooling operations. When cell monitoring is performed at a single location in a battery cell, a local indication of performance may be received, although any imbalance at a distal region may not be identified. This may cause issues within the cell, where a voltage differential across the cell may develop, which can impact operation and long-term capacity of the cell.

To overcome these potential issues, in embodiments of the present technology, fasteners may be included through the active area of the battery cells. The fasteners, which may interchangeably be called retaining members or which may include a retaining member as part of the fastener, may extend through channels or apertures defined through the battery. As described above, the fasteners may provide structural support across the dimensions of the battery, and may also provide access to cells for monitoring at a number of locations across the battery stack.

As shown in the figure, battery 300 may include a housing 305 or enclosure, which may form an internal volume for incorporating aspects of the battery. Seated within the housing may be a base plate 310, which may include a number of fasteners 315 or retaining members extending up from the base plate. A first circuit board 320 may be included overlying the base plate 310. The circuit board 320 may define a number of apertures through which each of the fasteners 315 may extend. A battery stack 325 may be disposed overlying the first circuit board 320. The battery stack 325 may be electrically coupled with the first circuit board, which may be operated at a first electrical potential. The battery stack 325 may include a number of battery cells, which may include any aspects of the battery cells as described above in some embodiments, including polymeric current collectors, and a configuration to deliver current vertically or through the current collectors to the next cell, as opposed to laterally, such as via conductive tabs coupled together in many conventional batteries.

The battery stack 325 may also define one or more apertures, including a plurality of apertures across the stack. As illustrated, the apertures may extend through the active regions of the battery stack, which may include sealed apertures, for example, through each battery cell to prevent shorting through the cell. A second circuit board 330 may be disposed overlying the battery stack 325, and the battery stack 325 may be electrically coupled with the circuit board, and operated at a second electrical potential, which may be the opposite potential at which the first circuit board may be operated. Current may be transferred vertically between the circuit boards, which may be similar to end plates as previously described. Accordingly, instead of joining a number of conductive tabs of each cell, current may be transferred from one cell to the next at all locations across the active area of the battery cells.

Second circuit board 330 may define a plurality of apertures through which the fasteners may extend. Shown extending from second circuit board 330 are housings 335 for fasteners 315, which may optionally be included in some embodiments as described below. A lid 340 may be disposed overlying the second circuit board 330. In some embodiments lid 340 may include both a compression plate and a lid as may be described further below, and in some embodiments the second circuit board may operate as a compression plate, again as further described below. Lid 340 may be coupled, such as bolted, bonded, welded, or otherwise coupled in any number of ways with housing 305 about a perimeter of the two components. Fasteners 315 may extend from base plate 310 through lid 340 in some embodiments, which may compressibly couple the compression plate, second circuit board, and/or lid with the base plate. Accordingly, in some embodiments, each of the circuit boards, and any base plate or compression plate, as well as the battery stack, and/or lid may include axially aligned apertures, which may produce channels through which the fasteners may extend. One or more aspects of the fastener may be conductive in some embodiments of the present technology, and thus in embodiments a seal may be formed in the active region of each battery cell of the battery stack about an aperture that partially defines the channel through the structure, at each location where an aperture may be formed.

Figure 4:
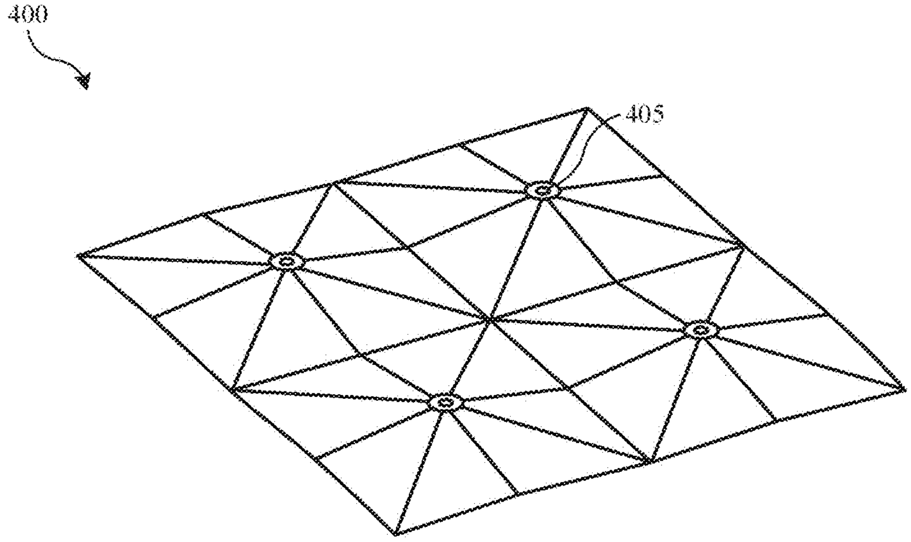
FIG. 4 shows a schematic partial view of a compression plate according to some embodiments of the present technology.

FIG. 4 shows a schematic partial view of a compression plate 400 according to some embodiments of the present technology. Although only four apertures are illustrated, it is to be understood that the plate may be characterized by any geometry, and may include any number of apertures through the plate. As will be explained further below, the figure may also be applicable to some circuit boards according to some embodiments of the present technology. As illustrated, the compression plate may include an uncompressed profile in a region about each aperture where fasteners may be extended. The profile may include a raised surface, such as a protrusion about each aperture. The deflection from a planar profile may be less than or about 200% of a thickness of the plate, which may be uniform across the plate in some embodiments. Additionally, the deflection may be less than or about 150% of a thickness of the plate, less than or about 100% the thickness of the plate, less than or about 75% the thickness of the plate, less than or about 50% the thickness of the plate, less than or about 40% the thickness of the plate, less than or about 30% the thickness of the plate, less than or about 25% the thickness of the plate, or less.

Figure 5:
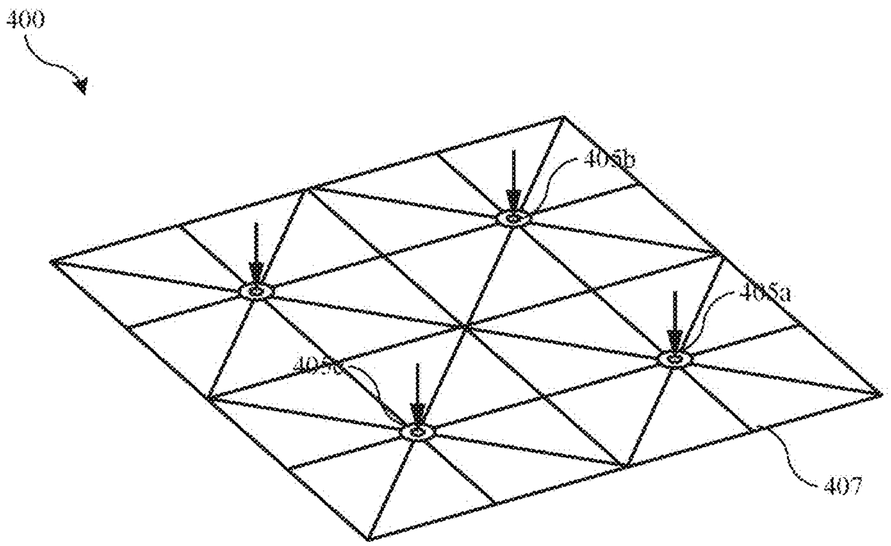
FIG. 5 shows a schematic partial view of a compression plate according to some embodiments of the present technology.

FIG. 5 shows a schematic partial view of compression plate 400 according to some embodiments of the present technology, and may illustrate the component in a compressed configuration. For example, when fasteners are actuated to load a force on the stack, the deflection about apertures 405 may be compensated to produce a planar compression plate, circuit board, or other component. This may increase a uniformity of compression across an entire surface of a battery stack, which may improve swell accommodation and temperature distribution across the cell. In some embodiments, when the plate is compressed, the configuration may provide substantially equal pressure on the underlying circuit board, battery stack, or any other component. By substantially may mean within 10% or less of equal pressure across the surface, and may mean less than or about 9%, less than or about 8%, less than or about 7%, less than or about 6%, less than or about 5%, less than or about 4%, less than or about 3%, less than or about 2%, less than or about 1%, or less. Due to the dimensions of plates according to some embodiments of the present technology, the apertures may be substantially equidistantly located from one another across a surface of the plate as illustrated.

Additionally, outermost apertures, such as proximate an edge of the plate, may be characterized by a similar or different distance from an edge of the component relative to a distance from an adjacent aperture. For example, if edge 407 were an edge of the component, aperture 405*a* may be a different distance from edge 407 than from aperture 405*b* or aperture 405*c*, which may be equally spaced from aperture 405*a*. From edge 407, aperture 405*a* may be spaced less than 100% the distance between apertures across the plate, and may be spaced less than or about 80% of the distance, less than or about 60% of the distance, less than or about 50% of the distance, less than or about 40% of the distance, less than or about 30% of the distance, or less. This may depend on the edge coupling of the overlying component, and whether the edge is secured or not in embodiments of the present technology.

The number of apertures across a plate, and the spacing, may impact the compression afforded by the configuration. Depending on the lateral dimensions of the battery, as well as the number of battery cells included in the battery stack, the number of fasteners, and corresponding apertures, may be increased or decreased to ensure a particular integrity against deformation from an opposing force, which may be due to battery cell swelling. For example, the components and integration may be configured to support and counteract a pressure from cell swelling that may be greater than or about 5 psi, and may be greater than or about 10 psi, greater than or about 15 psi, greater than or about 20 psi, greater than or about 25 psi, greater than or about 30 psi, greater than or about 35 psi, greater than or about 40 psi, greater than or about 45 psi, greater than or about 50 psi, or more, which across the dimensions of the cell as described above, may be a total outward pressure of over tens of thousands of pounds.

As described previously, conventional technologies that may only include edge coupling of enclosures may increase the compression plate, circuit board, or any other component thickness, or reinforce the components further to accommodate this level of pressure. However, the present technology may utilize the fasteners, which may allow the compression plate, circuit board, or any other component, to be reduced in thickness while still accommodating pressures as noted above.

The number of fasteners may be increased or decreased to accommodate any number of configurations. By increasing the number of fasteners, the thickness of the compression plate or circuit board may be reduced, while still affording a component capable of limiting or preventing deflection from cell swelling. For example, while some conventional technologies may require a compression plate with only edge coupling to be up to 10 cm in thickness or more to accommodate the noted pressures, the present technology may significantly reduce the component thickness by including fasteners. Again, the number of fasteners may be based on the size of the battery being produced, however, by utilizing fasteners in embodiments, the thickness of the compression plate or circuit board may be reduced to less than or about 15 mm, and may be reduced to less than or about 10 mm, less than or about 9 mm, less than or about 8 mm, less than or about 7 mm, less than or about 6 mm, less than or about 5 mm, less than or about 4 mm, less than or about 3 mm, less than or about 2 mm, or less. These compression plates at these thicknesses with the fasteners may be configured to substantially maintain planarity of the compression plate under an opposing force from cell swelling of any of the pressures noted above.

The number of fasteners may impact the volumetric or gravimetric energy density of batteries produced by the present technology, as increasing the fasteners and apertures through the cells may reduce the amount of active material in the battery. However, even with a few hundred apertures, based on the cell sizes described previously, volumetric energy density may be maintained at greater than or about 250 Wh/L with components of the thickness described above, and in some embodiments volumetric energy density may be maintained at greater than or about 275 Wh/L, greater than or about 300 Wh/L, greater than or about 325 Wh/L, greater than or about 350 Wh/L, greater than or about 375 Wh/L, greater than or about 400 Wh/L, greater than or about 425 Wh/L, greater than or about 450 Wh/L, or higher.

Similarly, because the thickness and corresponding weight of housing and other components may be reduced by incorporating fasteners, gravimetric energy density for batteries according to embodiments of the present technology may be maintained at greater than or about 50 Wh/kg, and may be maintained at greater than or about 75 Wh/kg, greater than or about 100 Wh/kg, greater than or about 125 Wh/kg, greater than or about 150 Wh/kg, greater than or about 175 Wh/kg, greater than or about 200 Wh/kg, greater than or about 225 Wh/kg, greater than or about 250 Wh/kg, or higher.

Batteries according to some embodiments of the present technology may include a number of configurations utilizing fasteners to accommodate internal pressure within the battery. FIGS. 6A-6D show schematic illustrations of batteries according to some embodiments of the present technology. The figures illustrate exemplary components and configurations as previously described, and may include any feature, component, or configuration as discussed above. The figures may illustrate cross-sections of one section of batteries including components as discussed above, although it is to be understood that the batteries may include much larger configurations as previously discussed.

Figure 6A:
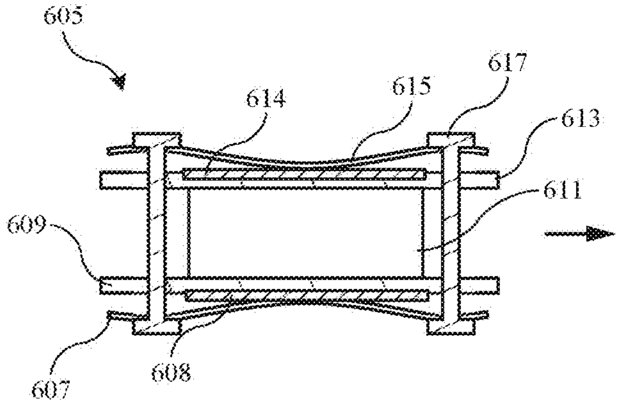
FIGS. 6A-6D show schematic illustrations of batteries according to some embodiments of the present technology.

For example, as shown in FIG. 6A, a portion of a battery 605 is shown between two adjacent fasteners. The battery may include a base plate 607, a first circuit board 609, a battery stack 611, a second circuit board 613, and a compression plate 615. It is to be understood that additional housing and lid structures may be included as previously described. The figure may illustrate the components prior to compression with fasteners 617 extending through the components. FIG. 6A also illustrates additional components that may be included in some embodiments of the present technology. For example, a first compliant pad 608 may be positioned between the base plate 607 and the first circuit board 609, which may facilitate equal compression across the circuit board and battery stack as previously described. Similarly, a second compliant pad 614 may be positioned between the second circuit board 613 and the compression plate 615, which may also facilitate equal compression across the components.

Figure 6B:
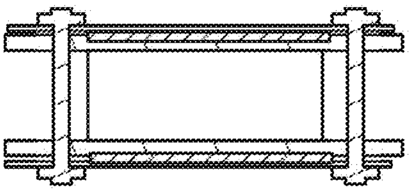

Compression plate 615 may be characterized by a profile in the uncompressed state as illustrated and as discussed above. Additionally, in some embodiments, base plate 607 may also be characterized by a profile in an uncompressed state, which may provide substantially equal pressure on the first circuit board 609 when the fasteners 617 are engaged. Accordingly, in some embodiments either one of the base plate or the compression plate, as well as both, may be characterized by a profile to support compression and improve uniformity of compression across the battery stack. As shown in FIG. 6B, when fasteners 617 are engaged, the profile of the compression plate and/or the base plate may be made planar or substantially planar, which may provide the battery stack with a controlled thickness and profile that may more uniformly accommodate cell swelling across the dimensions of the battery stack.

Figure 6C:
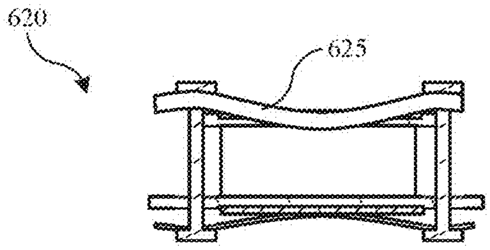
Figure 6D:
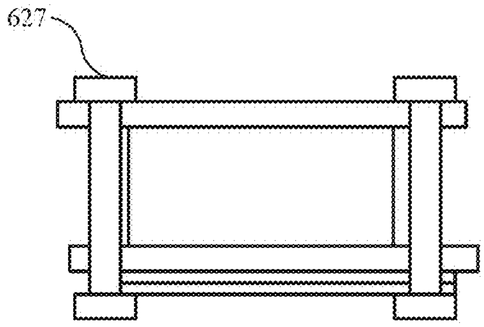

FIG. 6C illustrates another embodiment in which a battery 620 may not include a compression plate, and for which the second circuit board 625 may be characterized by a profile as described above. Battery 620 may include any of the other components as described previously for any battery, and may include any feature, component, or characteristic previously described. For example, although any material may be used to produce the circuit board, in some embodiments the second circuit board 625 may be reinforced with any number of materials, such as carbon fiber, nylon, ceramics, or other materials, that may improve structural integrity of the component. The board may be formed in a profile as discussed above for compression plate 400. Hence, when fasteners 627 are engaged as illustrated in FIG. 6D, second circuit board 625 may be compressed to a planar profile, which may provide equal compensating force against the battery stack. This may further reduce the overall battery thickness in some embodiments by removing the additional components.

Figure 7:
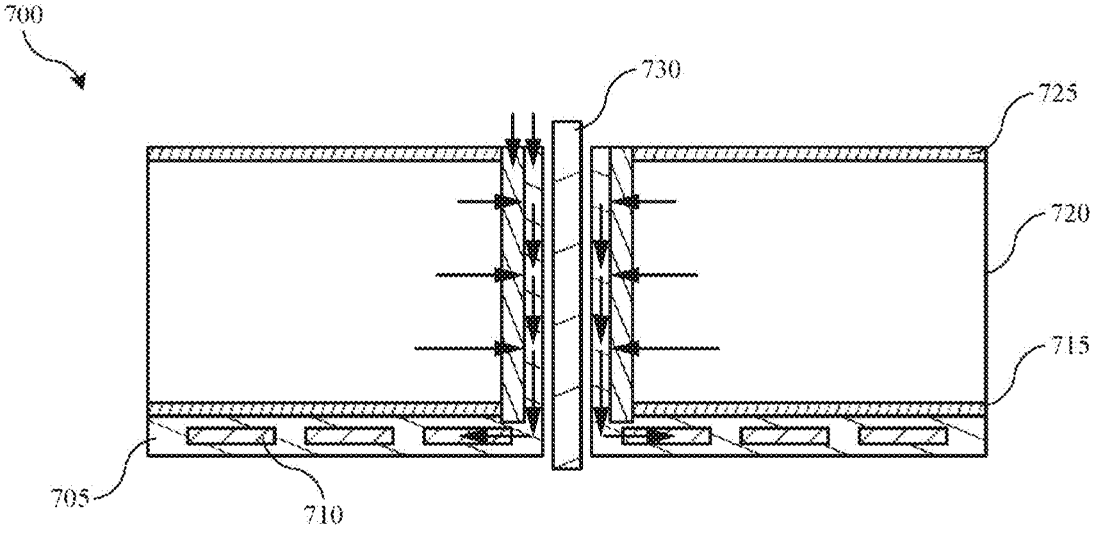
FIG. 7 shows a schematic partial cross-sectional view of a battery according to some embodiments of the present technology.

FIG. 7 shows a schematic partial cross-sectional view of a battery 700 according to some embodiments of the present technology. Battery 700 may include any of the components, features, or characteristics of any of the batteries or battery cells previously described, and may illustrate additional details of the components described above, as may be incorporated within a battery according to some embodiments of the present technology. For example, battery 700 may include components as discussed above to illustrate heat exchange capabilities of the present technology. It is to be understood that although not all components may be illustrated in this figure for ease of explanation, any of the previously noted battery components may be included in battery 700.

Battery 700 may show a base plate 705 that may define a plurality of channels 710 formed within the base plate, and which may be configured to receive a heat exchange fluid. The channels illustrated may be connected in one or more continuous channels, and may be configured to conduct a cooling fluid, refrigerant, air, or any other fluid that may be used to remove heat generated during operation of the battery. Battery 700 may also include features as previously described including a first circuit board 715, a battery stack 720, which may include any number of battery cells, and a second circuit board 725. It is to be understood that any other previously noted component may similarly be included. Although any number of apertures may be formed in the components, the figure illustrates one such aperture through each component that forms a channel through which a fastener 730 may extend.

Although heat exchangers may be incorporated anywhere with batteries according to some embodiments of the present technology, in some embodiments a heat exchanger may be incorporated within the base plate 705, which may allow heat to be removed from the battery stack. However, such an incorporation may produce a temperature gradient through a height of the battery stack, where battery cells nearer the base plate may be cooler and battery cells further from the base plate, such as nearer the second circuit board 725 may be warmer. Over time, this may impact individual cell performance within the battery stack. The present technology may at least partially reduce or remove this gradient by utilizing the fasteners 730 for additional heat transfer. By creating a heat transfer path from the base plate that extends through the fasteners, heat may be removed laterally from the battery stack at each fastener location before being transferred to the heat exchange fluid that may be flowed through the base plate channels.

Figure 8:
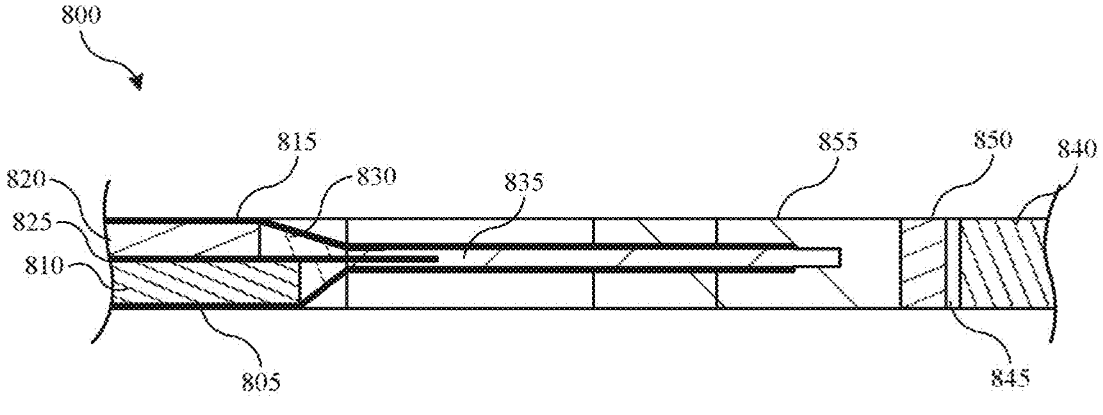
FIG. 8 shows a schematic partial cross-sectional view of a battery cell within a battery according to some embodiments of the present technology.

FIG. 8 shows a schematic partial cross-sectional view of a battery cell 800 within a battery according to some embodiments of the present technology. Battery cell 800 may include any of the components, features, or characteristics of any of the battery cells previously described, and may illustrate additional details of the components described above, as may be incorporated within a battery or battery stack according to some or any embodiments of the present technology, including any battery previously described. For example, battery cell 800 may illustrate an individual cell included within battery stack 720 as described above, or any other stack noted previously, and which may include base plate 705 including channels 710 for delivering heat exchange fluid. It is to be understood that although not all components may be illustrated in this figure for ease of explanation, any of the previously noted battery components may be included in battery cell 800.

As illustrated, and as previously described, battery cell 800 may include an anode current collector 805, which may be or include a polymeric material, and which may include an anode active material 810 disposed on the anode current collector. The battery cell 800 may include a cathode current collector 815, which may be or include a polymeric material, and which may include a cathode active material 820 disposed on the cathode current collector. A separator 825 may be disposed between the anode active material and the cathode active material, and electrolyte 830 may be included within the cell. At edge regions of the cell as previously described, the cell may be sealed off, or include seals as previously described.

Additionally, a seal 835 may be formed within the active region of the battery cells at each location where an aperture may be formed to receive a fastener 840 extending through each cell of the battery stack. The seal may extend as an annulus about each aperture formed to ensure the cells may remain sealed to prevent leakage or shorting within the cell. Heat exchange may be performed laterally in any number of ways in embodiments of the present technology. For example, heat exchange fluid may be flowed up and down through channels 845 formed within the fasteners, or the heat exchange fluid may be maintained in discreet channels within the base plate. To transfer heat to the fasteners, heat conductivity may be improved by including a compression sleeve 850, which may extend about the fastener 840. A thermally conductive potting 855 may be disposed on the sealed region of the battery cell and may extend to the compression sleeve 850 to increase thermal communication between the components. The compression sleeve may be a metal or other thermally conductive material, which may improve heat transfer from the battery cell. Either alone or with the fastener 840, the compression sleeve 850 may transfer heat down to the heat exchange fluid within the base plate, which may control a temperature within the battery stack.

Figure 9:
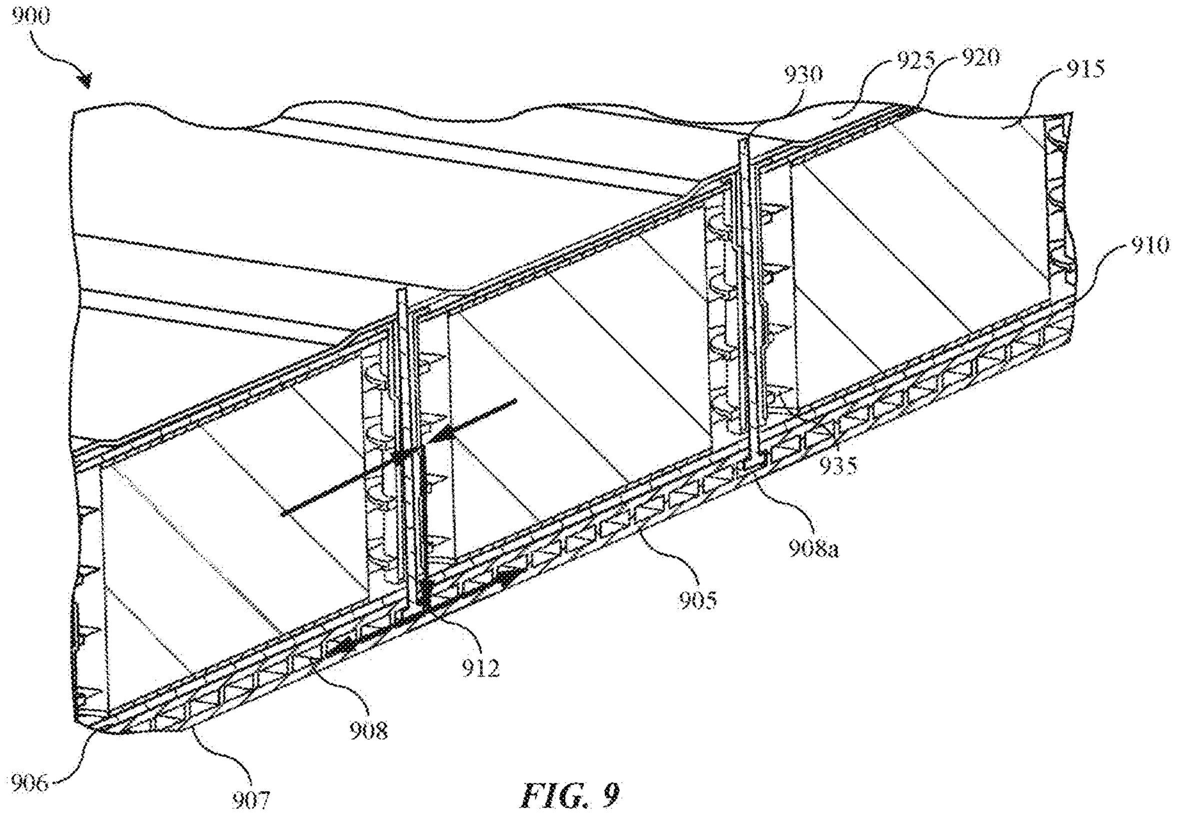
FIG. 9 shows a schematic partial cross-sectional view of a battery according to some embodiments of the present technology.

FIG. 9 shows a schematic partial cross-sectional view of a battery 900 according to some embodiments of the present technology. Battery 900 may include any of the components, features, or characteristics of any of the batteries or battery cells previously described, and may illustrate additional details of the components described above, as may be incorporated within a battery according to some embodiments of the present technology. For example, battery 900 may include components as discussed above to illustrate heat exchange capabilities of the present technology as well as monitoring capabilities utilizing fasteners according to some embodiments of the present technology. It is to be understood that although not all components may be illustrated in this figure for ease of explanation, any of the previously noted battery components may be included in battery 900.

Battery 900 may include a base plate 905, and may include a first circuit board 910 overlying the base plate. The first circuit board may define a plurality of apertures through the circuit board as previously described. A battery stack 915 may be seated overlying the first circuit board, and which may be electrically coupled with the first circuit board 910. The battery stack may include a plurality of battery cells as previously described, which may include tens or hundreds of battery cells within the stack. The battery stack may define a plurality of apertures through the active region of the battery stack. Battery 900 may include a second circuit board 920 overlying the battery stack 915, and which may be electrically coupled with the battery stack. The second circuit board may also define a plurality of apertures through the board. The apertures of the first circuit board may be axially aligned with corresponding apertures of the battery stack and the second circuit board, which may produce channels through the battery. The battery may have a lid 925 and/or a compression plate as previously described. A plurality of fasteners 930 may extend through the channels formed as previously described, and may secure the lid and/or compression plate with the base plate.

As described above, the base plate 905 may include a plurality of channels 908 that are configured to deliver a heat exchange fluid through the base plate. As illustrated, in some embodiments base plate 905 may be characterized by a first surface 906 facing the first circuit board 910, and a second surface 907 opposite the first surface. The plurality of heat exchange channels may be defined between the first surface and the second surface as illustrated. An aperture 912 may be formed through the base plate to receive the fastener 930. In some embodiments the fastener 930 may be maintained fluidly isolated from a heat exchange fluid flowing through the channels. For example, as illustrated, although aperture 912 may fully extend through the base plate, and channels 908 may extend about the aperture, in some embodiments the aperture may extend through first surface 906, while not extending through second surface 907. Additionally, a channel **908*a* may be formed beneath the fastener, and channel 908*a* may extend between the fastener 930 and the second surface 907 of the base plate. Channel 908*a* may be characterized by a reduced height relative to the other channels 908**, which may allow the fluid to flow in close proximity to the fastener for heat transfer, while maintaining the fastener isolated from flowing heat exchange fluid.

FIG. 9 may also illustrate aspects of monitoring capabilities afforded by some embodiments of the present technology. For example, because each battery cell of the battery stack 915 may be sealed about apertures through which fastener 930 may extend, fasteners 930 may include conductive couplings that can extend to monitoring circuitry that allows voltage, temperature, and other monitoring to be performed for each battery cell within the battery stack. For example, batteries may include one or more conductive extensions 935 throughout the battery stack, which may electrically couple individual battery cells of the battery stack with one or more fasteners 930 of the plurality of fasteners.

Figure 10:
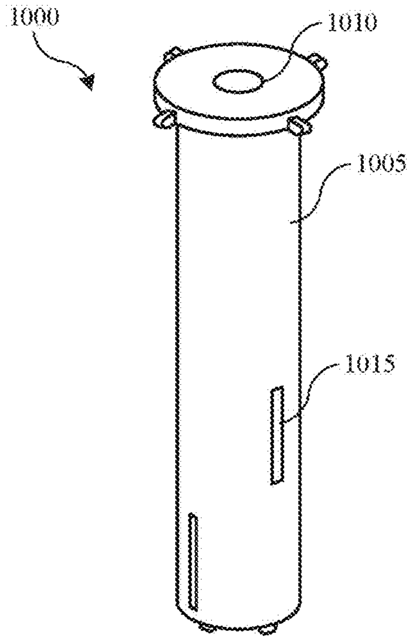
FIG. 10 shows a schematic view of aspects of a fastener according to some embodiments of the present technology.

FIG. 10 shows a schematic view of aspects of a fastener 1000 according to some embodiments of the present technology. Fastener 1000 may be included as any fastener or retaining member previously described, and may be included in any battery noted above. The fastener 1000 may include a retaining member that extends through a housing 1005 illustrated, such as through a central aperture 1010 extending through the housing. Housing 1005 may be an insulative material in some embodiments, and which may include one or more conductive elements extending through the housing to provide electrical coupling with one or more cells of the battery stack. For example, one or more conductive pins 1015, including a plurality of conductive pins, may extend through the housing 1005. The pins may be accessible at one or more locations through the housing, which may allow electrical coupling with monitoring equipment in some embodiments. For example, the conductive pins 1015 may be at least partially exposed through the insulative housing along a length of the conductive housing, which may allow the conductive pins to contact a conductive extension included with cells of the battery stack. The conductive pins may also be accessible at either the top or bottom of the housing as illustrated, to contact or interact with either or both circuit boards, and which may allow monitoring circuitry to access the conductive extension.

Figure 11:
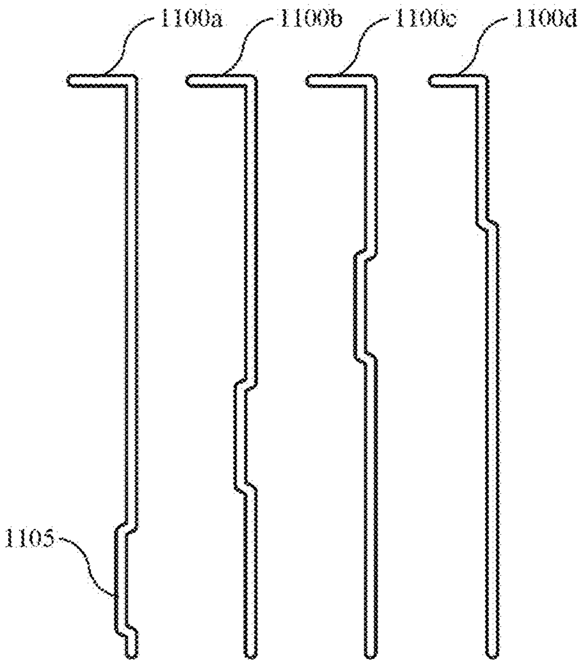
FIG. 11 shows a schematic view of conductive pins according to some embodiments of the present technology.

FIG. 11 shows a schematic view of conductive pins 1100 according to some embodiments of the present technology. The conductive pins are included as one example of conductive pins that may be incorporated with fasteners according to some embodiments of the present technology. For example, each housing may include one or more, including any number of conductive pins distributed about the housing as illustrated previously. Each fastener may include greater than or about two conductive pins within the housing, and may include greater than or about three conductive pins, greater than or about four conductive pins, greater than or about five conductive pins, greater than or about six conductive pins, greater than or about seven conductive pins, greater than or about eight conductive pins, greater than or about nine conductive pins, greater than or about ten conductive pins, or more, in some embodiments of the present technology. The conductive pins may be distributed circumferentially about the housing, and may be exposed at a different height along the fastener from each other conductive pin of the plurality of conductive pins.

For example, for the exemplary fastener 1000, four conductive pins 1015 were disposed about the housing, and each conductive pin was exposed through an access defined through the housing. The access size in the housing may correspond to a protrusion formed on the conductive pin. For the four pins included in the example, and understanding any number of pins may be included, pins 1100 may illustrate the different protrusions 1105 formed. Where pin 1100*a* may include a protrusion 1105 proximate a bottom of the pin, and where pin 1100*d* may include a protrusion proximate a top of the pin, pin 1100*b* may include a protrusion at a height above the protrusion of pin 1100*a*, and pin 1100*c* may include a protrusion at a height above the protrusion of pin 1100*b* and also below a height of the protrusion of pin 1100*d*. This scaled height may allow each fastener to access every cell within the battery stack, while only electrically coupling with the corresponding cell having a conductive extension. Such a configuration may facilitate manufacturing where every fastener may be formed similarly, and incorporated within the stack in any rotational orientation.

The height of the protrusion on each conductive pin that may be exposed through the housing may correspond to a thickness of one or more battery cells, such as greater than or about a height equal to a thickness of two cells of the battery stack. The height of the protrusion may correspond to a number of battery cells within the stack, such as a number of cells divided by the number of conductive pins included in each fastener. For example, for a fastener including four pins as shown, and which may be incorporated within a battery stack having 100 battery cells, each protrusion may correspond to a height greater than or equal to a thickness of 25 battery cells.

Figure 12:
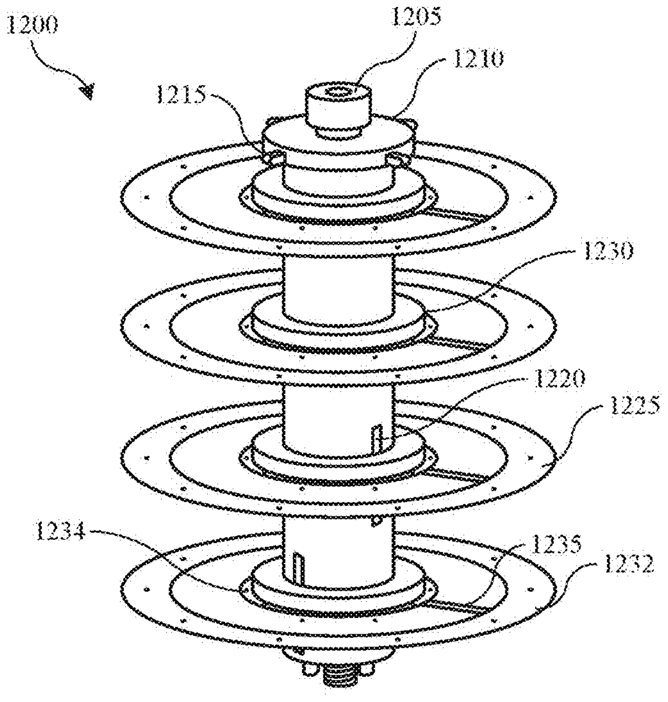
FIG. 12 shows a schematic view of aspects of a fastener according to some embodiments of the present technology.

FIG. 12 shows a schematic view of aspects of a fastener 1200 according to some embodiments of the present technology. Fastener 1200 may include any of the components previously described, and may be included in any battery noted above. Fastener 1200 may include any of the features of fastener 1000 or any other fastener discussed above. For example, fastener 1200 may include a retaining member 1205 that extends through a housing 1210 illustrated, such as through a central aperture extending through the housing. Retaining member 1205 may be a shoulder bolt as illustrated, although any fastener, screw, bolt, or coupling member may similarly be used in embodiments of the present technology. Housing 1210 may be an insulative material in some embodiments, and may include a plurality of conductive pins 1215 extending through the housing 1210. The pins may be accessible at one or more locations through the housing, such as at accesses 1220, which may allow the conductive pins to contact a conductive extension 1225 included with individual cells of the battery stack. The conductive pins may also be accessible at either the top or bottom of the housing as illustrated to contact or interact with either or both circuit boards, and which may allow monitoring circuitry to access the conductive extension.

Conductive extensions 1225 may be configured to accommodate an exposed portion of a pin regardless of the angular orientation. Although any conductive material may be used, in some embodiments a printed circuit board having two conductive annular components may be used. For example, conductive extensions 1225 may include an outer annular component 1232, which may electrically couple with the battery cell about the aperture. Additionally, conductive extensions 1225 may include an inner annular component 1234, which may ensure contact with a corresponding pin regardless of the orientation of the fastener. An extension 1235 may electrically couple the inner annular component with the outer annular component, which may allow the pin to receive a reading or measurement from the corresponding cell.

As discussed above, each conductive pin 1215 may be exposed for a height that may be greater than or about a height corresponding to multiple battery cells. Conductive extensions 1225 may be distributed about the apertures for each cell and each cell may include a conductive extension at greater than or about two apertures across the cell, which may allow voltage or other monitoring at multiple locations at each battery cell utilizing at least two or more fasteners, where each fastener may allow measurement at one location for multiple cells. The number of cells that may be monitored at each position may be equal to the number of conductive pins through the housing of the fastener. A spacer 1230, which may be insulative, may be included above or below each conductive extension in some embodiments, which may ensure contact is maintained between the conductive pin and the cell including the conductive extension.

Thus, based on the number of fasteners and the number of conductive pins per fastener, each fastener within a particular region of the battery stack may facilitate measurements for a number of cells corresponding to the number of pins in the fastener. The conductive extensions may be included within the region to include contact with each cell, and the height of the exposed portion of each pin may accommodate a number of cells within the region. Hence, each fastener may contact multiple cells within the stack, and adjacent battery cells having a conductive extension at different apertures from one another within the region may each be contacted by the same pin in two corresponding fasteners. This may then be repeated for each additional region to provide monitoring capabilities for each cell within the battery stack at multiple locations.

Figure 13:
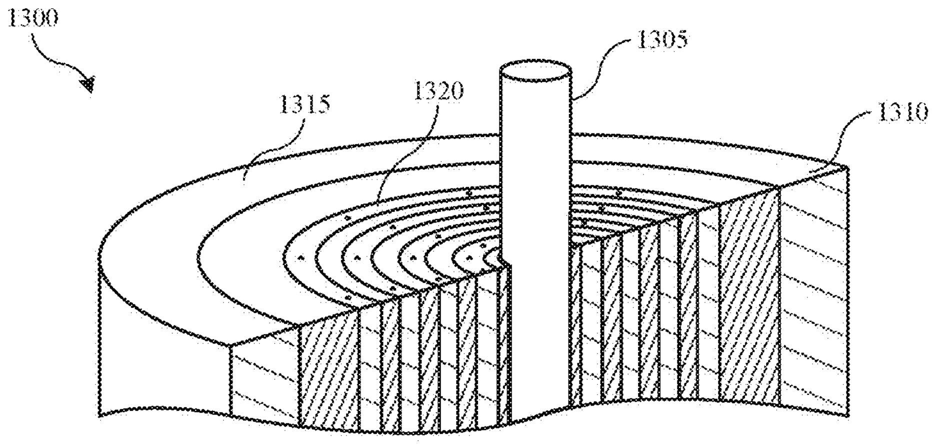
FIG. 13 shows a schematic partial view of aspects of a fastener according to some embodiments of the present technology.

FIG. 13 shows a schematic partial view of aspects of a fastener 1300 according to some embodiments of the present technology. Fastener 1300 may illustrate an additional embodiment encompassed by the present technology for utilizing the fasteners to conduct cell monitoring in different regions of the battery stack. It is to be understood that fasteners discussed throughout are examples encompassed by the present technology and any number of different configurations for conductively contacting batteries may be similarly encompassed by the present technology. Fastener 1300 may include a retaining member 1305, which may be similar to retaining member 1205, or any other fastener discussed previously. Fastener 1300 may also include a stack of printed circuit boards or other materials defining a set of annular conductive paths vertically through the fastener, as well as a set of annular conductive extensions coupling with individual cells.

Each circuit board 1310 of the plurality of circuit boards may include a number of annular conductive aspects electrically separated from one another. The corresponding annuluses of each board may be electrically connected as illustrated, which may produce a set of annular conductive paths extending vertically through the fastener and battery stack. A radially outermost annular conductive path 1315 may couple with a corresponding battery cell and provide electrical coupling with the cell. The number of boards may be equal to the number of cells within the battery stack, and the number of cells that may be tested with each fastener may correspond to the number of inner annular conductive paths 1320 formed by the fastener.

Figure 14A:
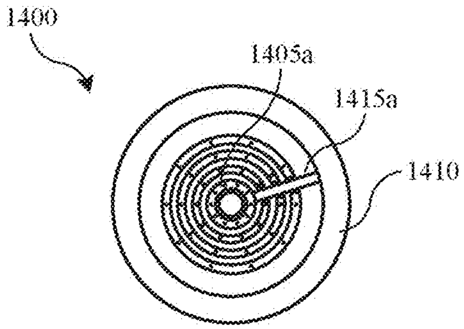
FIGS. 14A-14E show schematic views of aspects of a fastener according to some embodiments of the present technology.

Fasteners 1300 may be formed by coupling a set of channel boards with a set of boards including conductive extensions for each inner annular path through the fastener. FIGS. 14A-14E show schematic views of aspects of a fastener according to some embodiments of the present technology, and may show the boards included with each fastener. For example, a fastener 1400 may include each board illustrated in FIGS. 14A-14E. It is to be understood that fasteners according to embodiments of the present technology may include any number of inner annular rings, which may allow testing of a corresponding number of cells per fastener. Fastener 1400 illustrates an exemplary fastener including four inner annular elements 1405 and an outer annulus 1410, which may electrically couple with a corresponding battery cell. FIG. 14A illustrates a first board having a conductive trace 1415*a* extending from inner annular element 1405*a* to outer annulus 1410. Although described as annular, on the board illustrated in FIG. 14A, each other inner element includes a gap to electrically insulate the element from conductive trace 1415*a* extending through the board.

Figure 14B:
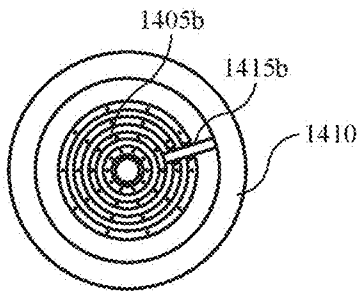
Figure 14C:
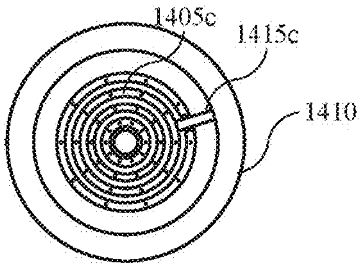
Figure 14D:
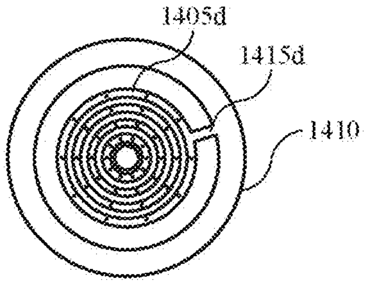
Figure 14E:
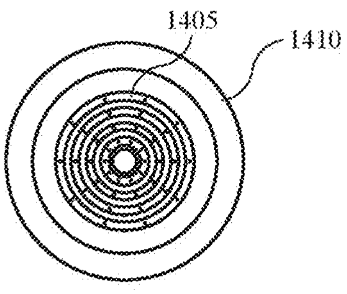

Similarly, FIG. 14B illustrates a second board having a conductive trace 1415*b* extending between a second annular element 1405*b* and outer annulus 1410, which may be coupled with a second battery cell. FIG. 14C illustrates a third board having a conductive trace 1415*c* extending between a third annular element 1405*c* and outer annulus 1410, which may be coupled with a third battery cell. FIG. 14D illustrates a fourth board having a conductive trace 1415*d* extending between a fourth annular element 1405*d* and outer annulus 1410, which may be coupled with a fourth battery cell. FIG. 14E illustrates one of a set of channel boards, which may not couple any of the other inner annular channels, and thus may provide the annular contact channels, and may provide a return path for testing received from the particular underlying cell being tested through the coupled outer annulus 1410 for each cell. In between each conductive annular element may be an insulative material, which may insulate each path from one another.

Figure 15:
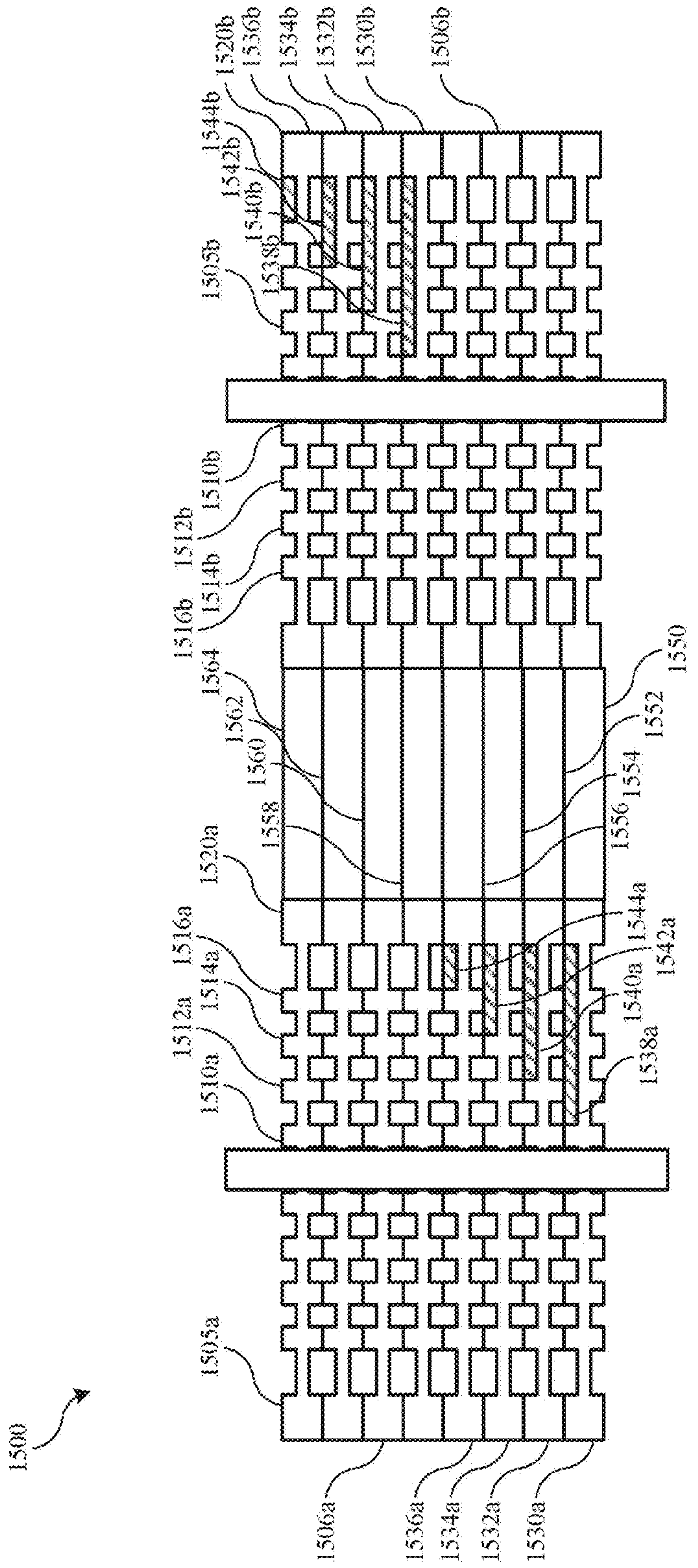
FIG. 15 shows a partial schematic cross-sectional view of aspects of a battery according to some embodiments of the present technology.

These boards may be configured in a pattern to incorporate the boards at different levels with different fasteners, which may allow each battery cell to be tested or monitored in embodiments of the present technology. FIG. 15 shows a partial schematic cross-sectional view of aspects of a battery 1500 according to some embodiments of the present technology. Battery 1500 may include any of the components, features, or characteristics of any of the batteries or battery cells previously described, and may illustrate additional details of the components described above, as may be incorporated within a battery according to some embodiments of the present technology. For example, battery 1500 may include components as discussed above to illustrate how fasteners 1400 may adjust the location of the set of boards to test individual cells within the stack. It is to be understood that although not all components may be illustrated in this figure for ease of explanation, any of the previously noted battery components may be included with battery 1500.

Battery 1500 may illustrate two fasteners 1505 as noted above that may be included through a battery stack 1525. Although the battery stack illustrated includes only eight battery cells, this is to facilitate explanation, and it is to be understood that batteries according to embodiments of the present technology may include any number of battery cells. Fasteners 1505 may include coupled boards as previously described, which may provide a set of annular conductive paths through the fastener to provide coupling with individual cells within the stack. As shown, fastener 1505*a* may include a set of channel boards 1506*a*, which may be similar to the boards illustrated in FIG. 14E, and which produce the annular conductive paths vertically through the fastener. For example, a first annular conductive path 1510*a*, a second annular conductive path 1512*a*, a third annular conductive path 1514*a*, and a fourth annular conductive path 1516*a*. The boards 1506*a* also include an outer annular element that provides a fifth annular conductive path 1520*a*, and each outer annular element electrically couples with an individual battery cell of the stack.

Fastener 1505*a* also includes boards as described above that include a conductive trace extending between one of the inner annular elements with the outer annular path 1520*a*, and the corresponding battery cell within the stack. For example, similar to the board illustrated in FIG. 14A, board 1530*a* may include a conductive trace 1538*a* coupling first annular conductive path 1510*a* with battery cell 1550. Accordingly, coupling circuitry with path 1510*a* allows testing of battery cell 1550 at the location where fastener 1505*a* extends through the battery cell. Similar to the board illustrated in FIG. 14B, board 1532*a* may include a conductive trace 1540*a* coupling second annular conductive path 1512*a* with battery cell 1552. Accordingly, coupling circuitry with path 1512*a* allows testing of battery cell 1552 at the location where fastener 1505*a* extends through the battery cell. Similar to the board illustrated in FIG. 14C, board 1534*a* may include a conductive trace 1542*a* coupling third annular conductive path 1514*a* with battery cell 1554. Accordingly, coupling circuitry with path 1514*a* allows testing of battery cell 1554 at the location where fastener 1505*a* extends through the battery cell. Similar to the board illustrated in FIG. 14D, board 1536*a* may include a conductive trace 1544*a* coupling second annular conductive path 1516*a* with battery cell 1556. Accordingly, coupling circuitry with path 1516*a* allows testing of battery cell 1556 at the location where fastener 1505*a* extends through the battery cell.

The incorporation of the conductive trace boards may then be adjusted for each other fastener to allow testing of each other cell within the stack. For example, although fastener 1505*b* is illustrated as adjacent fastener 1505*a*, it is to be understood that the fastener could be incorporated anywhere else in the battery stack. The boards included in the fastener may all be the same, but the conductive trace boards may be located at a different vertical location to afford monitoring of additional battery cells. For example, fastener 1505*b* may include channel boards 1506*b* included coupled with cells being monitored by fastener 1505*a*, along with any other fastener, but may include boards including conductive traces to monitor a different set of battery cells.

Similar to board 1530*a*, board 1530*b* may include a conductive trace 1538*b* coupling first annular conductive path 1510*b* with battery cell 1558 at a corresponding outer annulus 1520*b*. Accordingly, coupling circuitry with path 1510*b* allows testing of battery cell 1558 at the location where fastener 1505*b* extends through the battery cell. Continuing the example, similar to board 1532*a*, board 1532*b* may include a conductive trace 1540*b* coupling second annular conductive path 1512*b* with battery cell 1560. Accordingly, coupling circuitry with path 1512*b* allows testing of battery cell 1560 at the location where fastener 1505*b* extends through the battery cell. Similar to board 1534*a*, board 1534*b* may include a conductive trace 1542*b* coupling third annular conductive path 1514*b* with battery cell 1562. Accordingly, coupling circuitry with path 1514*b* allows testing of battery cell 1562 at the location where fastener 1505*b* extends through the battery cell. Finally, similar to board 1536*a*, board 1536*b* may include a conductive trace 1544*b* coupling fourth annular conductive path 1516*b* with battery cell 1564. Accordingly, coupling circuitry with path 1516*b* allows testing of battery cell 1564 at the location where fastener 1505*b* extends through the battery cell. An additional benefit of this coupling may allow fasteners to monitor adjacent battery cells within a stack.

Figure 16:
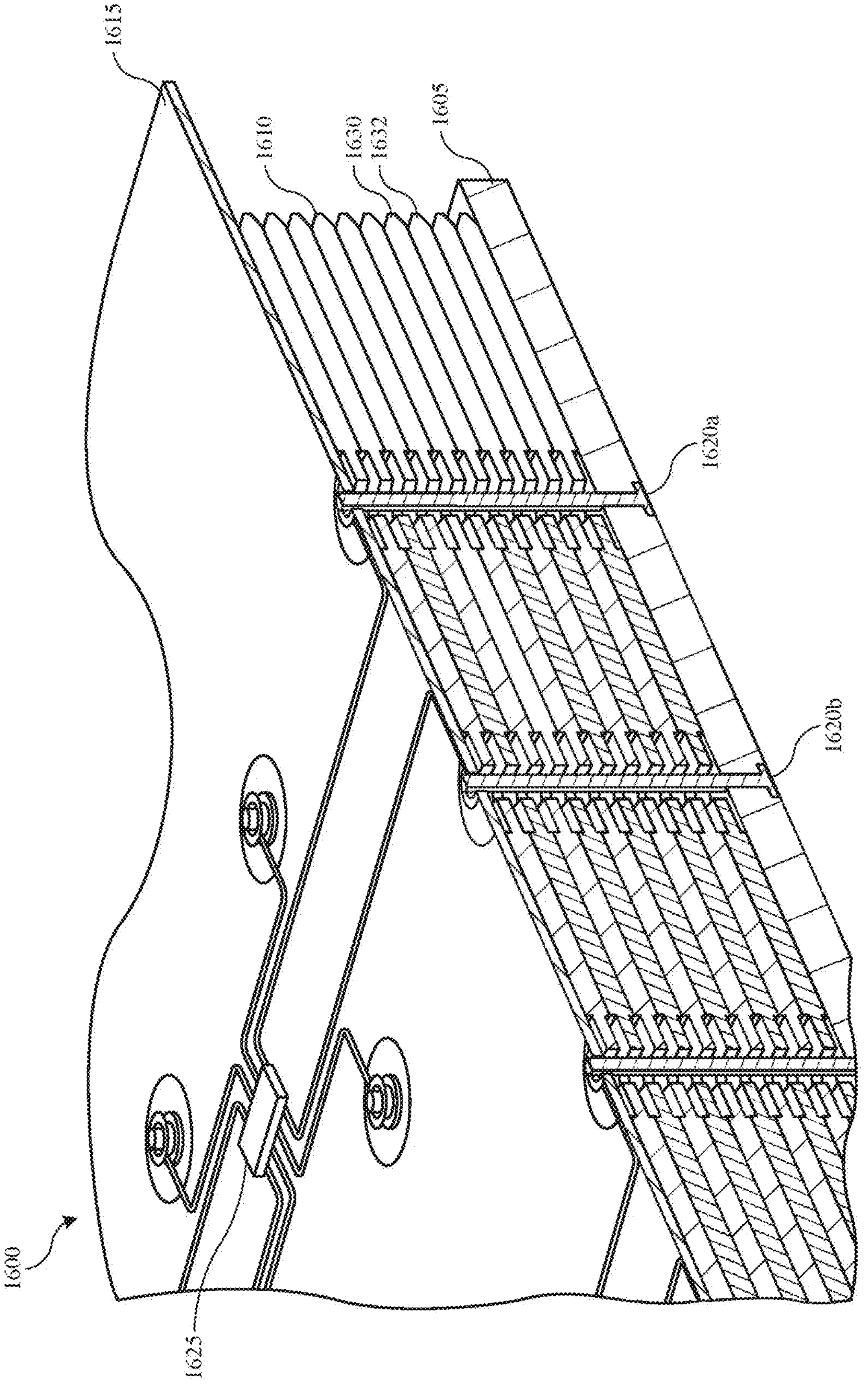
FIG. 16 shows a partial schematic cross-sectional view of aspects of a battery according to some embodiments of the present technology.

FIG. 16 shows a partial schematic cross-sectional view of aspects of a battery 1600 according to some embodiments of the present technology. Battery 1600 may include any of the components, features, or characteristics of any of the batteries or battery cells previously described, and may illustrate additional details of the components described above, as may be incorporated within a battery according to some embodiments of the present technology. For example, battery 1600 may include components as discussed above to illustrate how fasteners may be used to test individual cells within the stack. It is to be understood that although not all components may be illustrated in this figure for ease of explanation, any of the previously noted battery components may be included with battery 1600.

For example, battery 1600 shows a base plate 1605 having a battery stack 1610. It is to be understood that a first circuit board may be included as previously described. Overlying the battery stack 1610 may be a second circuit board 1615. A plurality of fasteners 1620, which may include any of the fasteners previously described, may extend through the components as previously discussed. Second circuit board 1615 may include or be associated with circuitry coupled with each fastener or a set of the fasteners. The circuitry may be configured to receive voltage or other measurements from individual battery cells within the battery stack. The circuitry may include a monitor or chip that may include conductive traces extending to each fastener, as well as additional connections extending to a battery management system. Although illustrated with a single trace or wire extending to each fastener, it is to be understood that each fastener may include couplings for multiple wires. For example, fastener 1200 and fastener 1300 may each have accommodated four such wires for testing as noted above.

The figure illustrates how a first wire extending from monitor 1625 may electrically couple with fastener 1620*a* to electrically couple with battery cell 1630 and receive a voltage or other measurement at that location through cell 1630 using any of the coupling previously described, or any other coupling that may be used to connect with an individual cell. Similarly, a second wire extending from monitor 1625 may electrically couple with fastener 1620*b* to electrically couple with battery cell 1632 and receive a voltage or other measurement at that location through cell 1632 using any of the coupling previously described, or any other cell coupling. Accordingly, the present technology may allow measurements to be received from each individual battery cell from any number of locations through the battery stack utilizing fasteners as discussed throughout the present disclosure.

Figure 17:
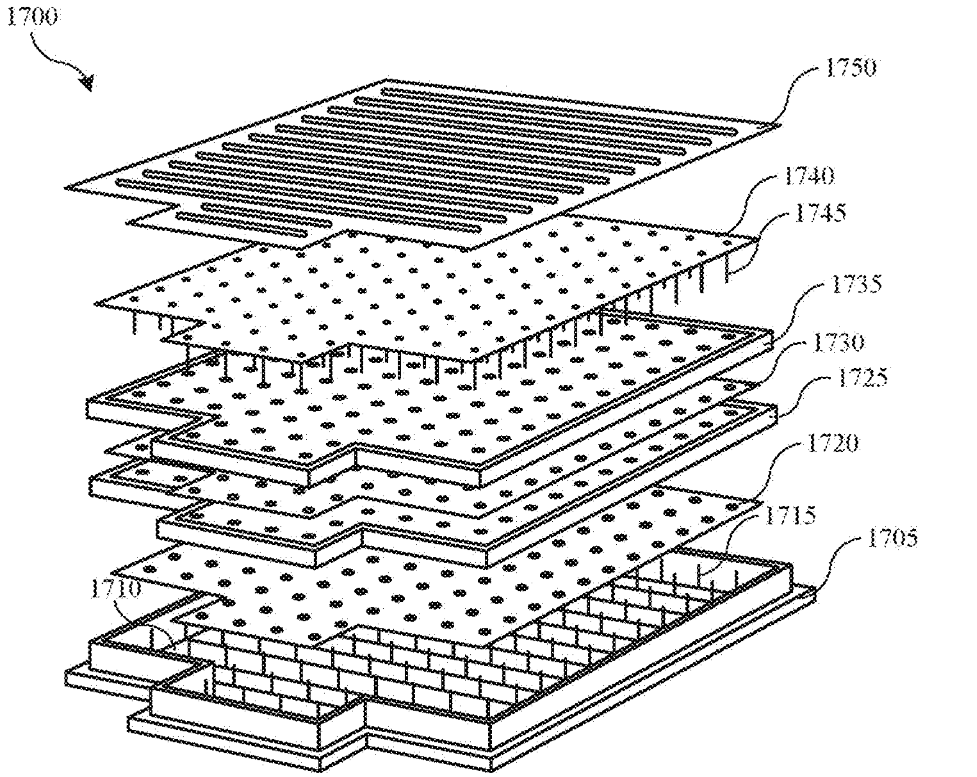
FIG. 17 shows a schematic exploded view of a battery according to some embodiments of the present technology.

Battery stacks according to embodiments of the present technology may include a number of battery cells coupled in series to provide a specific voltage for the battery stack. The present technology may also utilize fasteners as previously described to provide parallel coupling of multiple battery stacks incorporated within a battery to provide increased capacity. FIG. 17 shows a schematic exploded view of a battery 1700 according to some embodiments of the present technology. Battery 1700 may include any of the components, features, or characteristics of any of the batteries or battery cells previously described, and may illustrate additional details of the components described above, as may be incorporated within a battery according to some embodiments of the present technology. For example, battery 1700 may include components as discussed above to illustrate how multiple battery stacks may be incorporated in batteries according to some embodiments of the present technology. It is to be understood that although not all components may be illustrated in this figure for ease of explanation, any of the previously noted battery components may be included with battery 1700.

As shown in the figure, battery 1700 may include a housing 1705 or enclosure, which may form an internal volume for incorporating aspects of the battery. Seated within the housing may be a base plate 1710, which may include a number of fasteners 1715 or retaining members extending up from the base plate. Base plate 1710 may include any of the features of base plates described previously, including channels for a heat transfer fluid, for example. A first circuit board 1720 may be included overlying the base plate 1710. The circuit board 1720 may define a number of apertures through which each of the fasteners 1715 may extend. The first circuit board may be operatively coupled at a first electrical potential. A first battery stack 1725 may be disposed overlying the first circuit board 1720. The first battery stack 1725 may be electrically coupled with the first circuit board. The first battery stack 1725 may include a number of battery cells, which may include any aspects of the battery cells as described above.

The first battery stack 1725 may also define one or more apertures, including a plurality of apertures across the stack. As illustrated, the apertures may extend through the active regions of the battery stack, which may include sealed apertures, for example, through each battery cell to prevent shorting through the cell. A second circuit board 1730 may be disposed overlying the first battery stack 1725. Second circuit board 1730 may be operatively coupled at a second electrical potential opposite the first, and the first battery stack 1725 may be electrically coupled with the second circuit board. Second circuit board 1730 may define a plurality of apertures through which the fasteners may extend.

A second battery stack 1735 may be disposed overlying the second circuit board 1730, and may be electrically coupled with the second circuit board. Similar to the first battery stack, second battery stack 1735 may include a plurality of battery cells, and may include the same number of battery cells as the first battery stack in some embodiments. The battery cells in the first and second battery stacks may include any of the features or characteristics of battery cells discussed throughout the present technology. The second battery stack may define a plurality of apertures through an active region of the second battery stack, and each of these apertures may be axially aligned with the other apertures to allow fasteners 1715 to extend through the second battery stack as well. A third circuit board 1740 may be positioned overlying the second battery stack 1735. Third circuit board 1740 may be operatively coupled at the first electrical potential, similar to the first circuit board. The third circuit board may define a plurality of apertures through the board, which may be axially aligned with the other apertures. Accordingly, a set of channels to receive fasteners 1715 may be defined by the plurality of apertures through each of the first circuit board, the first battery stack, the second circuit board, the second battery stack, and the third circuit board.

Shown extending from third circuit board 1740 are housings 1745 for fasteners 1715, which may optionally be included in some embodiments as described previously. A lid 1750 may be disposed overlying the second circuit board 1740. In some embodiments lid 1750 may include both a compression plate and a lid as described previously, and in some embodiments the second circuit board may operate as a compression plate, again as described above. Lid 1750 may be coupled with housing 1705 about a perimeter of the two components as previously described. Fasteners 1715 may extend from base plate 1710 through lid 1750 in some embodiments, which may compressibly couple the components as discussed above.

Figure 18:
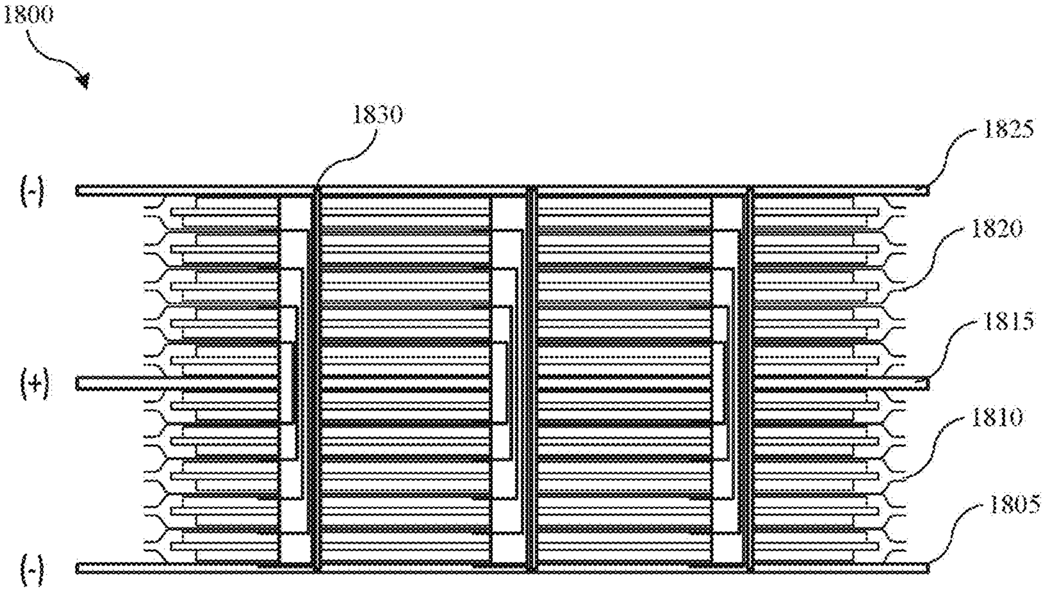
FIG. 18 shows a schematic cross-sectional view of a battery according to some embodiments of the present technology.

To produce parallel coupling between the first battery stack and the second battery stack, fasteners may be used to provide electrical coupling between a battery cell of the first battery stack and a battery cell of the second battery stack. FIG. 18 shows a schematic cross-sectional view of a battery 1800 according to some embodiments of the present technology. Battery 1800 may include any of the components, features, or characteristics of any of the batteries or battery cells previously described, and may illustrate additional details of the components described above, as may be incorporated within a battery according to some embodiments of the present technology. For example, battery 1800 may include components as discussed above to illustrate how fasteners may parallel couple battery cells according to some embodiments of the present technology. It is to be understood that although not all components may be illustrated in this figure for ease of explanation, any of the previously noted battery components may be included with battery 1800.

For example, battery 1800 may include a first circuit board 1805, a first battery stack 1810, a second circuit board 1815, a second battery stack 1820, and a third circuit board 1825. Fasteners 1830 as previously described may extend through each of these components. In some embodiments, the fasteners may provide electrical coupling between one or more pairs of battery cells between the first battery stack and the second battery stack as illustrated. Each fastener may couple a single battery cell from the first battery stack with a single battery cell from the second battery stack, or may couple more pairs, up to every pair of battery cells between the two battery stacks. Accordingly, through one or more fasteners, each battery cell of the first battery stack may be electrically coupled in parallel with a corresponding battery cell of the second battery stack.

Figure 19:
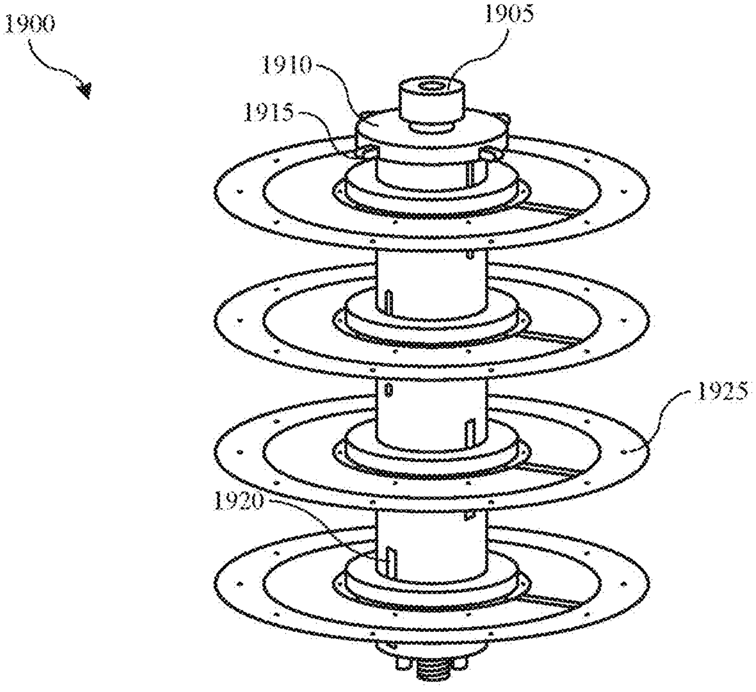
FIG. 19 shows a schematic view of aspects of a fastener according to some embodiments of the present technology.

Any number of electrical couplings may be provided to couple battery cells within batteries according to embodiments of the present technology. FIG. 19 shows a schematic view of aspects of a fastener 1900 according to some embodiments of the present technology. Fastener 1900 may include any of the components previously described, and may be included in any battery noted above. Fastener 1900 may include any of the features of fastener 1000 or 1200 or any other fastener discussed above. For example, fastener 1900 may include a retaining member 1905 that extends through a housing 1910 illustrated, such as through a central aperture extending through the housing. Housing 1910 may be an insulative material in some embodiments, and may include a plurality of conductive pins 1915 extending through the housing 1910. The pins may be accessible at one or more locations through the housing, such as at accesses 1920, which may allow the conductive pins to contact a conductive extension 1925 included with individual cells of the battery stack. The conductive pins may also be accessible at the top and/or bottom of the housing to contact or interact with any of the circuit boards, and which may allow monitoring circuitry to access the conductive extension.

Figure 20:
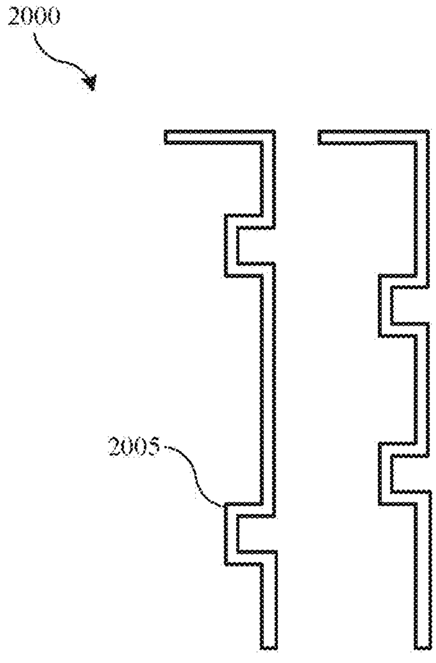
FIG. 20 shows a schematic view of conductive pins according to some embodiments of the present technology.

Conductive extensions 1925 may be similar to conductive extensions described above, such as extensions 1225, although any conductive coupling may be used to connect battery cells between the battery stacks in exemplary batteries. Each pin may be partially exposed at two positions along the housing, which may allow the pin to contact a battery cell in the first battery stack and a corresponding battery cell in the second battery stack as illustrated. The conductive pins may be distributed about the housing as previously described, and may include protrusions extending through the accesses of the housing. FIG. 20 shows a schematic view of conductive pins 2000 according to some embodiments of the present technology, and which may allow conductive coupling of battery cells for parallel operation of battery stacks. As illustrated, each conductive pin may include protrusions at locations corresponding to a cell of the first stack and an associated cell of the second stack. Pins may include protrusions at different heights from other pins to access battery cells at different locations within the stacks. Each fastener may include one or more pins to access particular cells between the two stacks. Although two pins are shown for fastener 1900 coupling, it is to be understood that any number of additional pins may be included to couple additional cells between the stacks.

Protrusions 2005 for the pins may be reduced height compared to protrusions previously described, as protrusions 2005 may be configured to access a single cell. Each protrusion may be insulated from all but a single battery cell of the first battery stack and a single battery cell of the second battery stack in embodiments by reducing the exposure through the housing and/or including additional insulators as shown. As illustrated and discussed previously, circuitry may be included with the battery to perform cell monitoring with the fasteners as previously described for each battery cell pair between the stacks. By utilizing fasteners and battery components as discussed throughout the present technology, structural advantages may be provided to the battery along with a variety of monitoring and coupling capabilities.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery comprising:

a base plate;

a first circuit board overlying the base plate and defining at least one first aperture;

a battery stack overlying the first circuit board and electrically coupled with the first circuit board and defining at least one second aperture, wherein the battery stack comprises a plurality of battery cells stacked on top of one another, wherein a first current collector of a first cell in the battery stack contacts a second current collector of a second cell disposed directly below the first cell in the battery stack; and a fastener extending through at least one of each of the first and second apertures, wherein the fastener comprises:

a housing;

a central aperture extending through the housing;

a retaining member extending through the central aperture; and at least one conductive pin extending through the housing and at least partially exposed through the housing, wherein the at least one conductive pin is in electrical communication with at least one battery cell of the plurality of battery cells.

2. The battery of claim 1 further comprising a second circuit board overlying the battery stack and defining a third aperture, wherein the second circuit board is electrically coupled with the battery stack.

3. The battery of claim 2, wherein the fastener extends through at least one of each of the first, second, and third apertures.

4. The battery of claim 1, wherein the at least one conductive pin includes a protrusion configured to extend through a first access defined in the housing.

5. The battery of claim 4 further comprising a conductive extension configured to electrically couple the at least one conductive pin to the at least one battery cell of the plurality of battery cells.

6. The battery of claim 5, wherein the conductive extension comprises:

an outer annular component electrically coupled to the at least one battery cell of the plurality of battery cells; and an inner annular component positioned at least partially adjacent to the first access and configured to contact with the at least one conductive pin, wherein the outer annular component and the inner annular component are in electrical communication with one another.

7. The battery of claim 6, wherein the conductive extension further includes a spacer positioned at the inner annular component and configured to ensure contact is maintained between the at least one conductive pin and the inner annular component.

8. The battery of claim 1, wherein the at least one conductive pin is configured to electrically couple the at least one conductive pin to multiple battery cells of the plurality of battery cells.

9. The battery of claim 1, wherein the at least one conductive pin accessible at a top or a bottom of the housing.

10. The battery of claim 1, wherein the housing comprises insulated material.

11. The battery of claim 1, wherein the plurality of battery cells includes a first battery cell and a second battery.

12. The battery of claim 1, wherein the plurality of battery cells includes a first battery cell and a second battery cell, and wherein the at least one conductive pin includes a first conductive pin in electrical communication with the first battery cell and a second conductive pin in electrical communication with the second battery cell.

13. The battery of claim 12, wherein the first conductive pin includes a first protrusion configured to extend through a first access defined in the housing and the second conductive pin includes a second protrusion configured to extend through a second access defined in the housing.

14. The battery of claim 13, wherein the first protrusion and the first access are positioned at a first position along a longitudinal axis of the housing and the second protrusion and the second access are positioned at a second position along the longitudinal axis of the housing different from the first position.

15. The battery of claim 14 further comprising a first conductive extension configured to electrically couple the first conductive pin with the first battery cell and a second conductive extension are configured to electrically couple the second conductive pin with the second battery cell.

16. A battery comprising:

a base plate;

a first circuit board overlying the base plate and defining at least one first aperture;

a battery stack overlying the first circuit board and electrically coupled with the first circuit board and defining at least one second aperture, wherein the battery stack comprises a plurality of battery cells stacked on top of one another, wherein a first current collector of a first cell in the battery stack contacts a second current collector of a second cell disposed directly below the first cell in the battery stack;

a fastener extending through at least one of each of the first and second apertures, wherein the fastener comprises:

a housing having a first end positioned at the first circuit board;

a central aperture extending through the housing;

a retaining member; and at least one conductive pin extending through the housing and at least partially exposed through the housing, wherein the at least one conductive pin is in electrical communication with at least one battery cell of the plurality of battery cells and with the first circuit board.

17. The battery of claim 16, wherein the first circuit board is configured to monitor cell characteristics of the at least one battery cell in electrical communication with the at least one conductive pin and the first circuit board.

18. The battery of claim 16 further comprising a second circuit board overlying the battery stack, wherein the second circuit board is electrically coupled to the at least one conductive pin and the at least one battery cell and is configured to monitor cell characteristics of the at least one battery cell in electrical communication with the at least one conductive pin and the second circuit board.

19. The battery of claim 16, wherein the plurality of battery cells includes a first battery cell and a second battery cell, and wherein the at least one conductive pin includes:

a first conductive pin electrical communication with the first battery cell, the first circuit board, and the second circuit board; and a second conductive pin in electrical communication with the second battery cell, the first circuit board, and the second circuit board.

20. The battery of claim 19, wherein the first circuit board is configured to monitor cell characteristics of the first battery cell and the second battery cell.

* * * * *